(12) United States Patent
Roberson et al.

(10) Patent No.: US 11,654,977 B2
(45) Date of Patent: May 23, 2023

(54) CARGO RACK FOR UTILITY TASK VEHICLE

(71) Applicant: Omega Solutions, Inc., Russellville, AR (US)

(72) Inventors: Russell K. Roberson, Atkins, AR (US); Jeremy T. Brogdon, Greenbrier, AR (US); Stanford S. Austin, Atkins, AR (US)

(73) Assignee: Omega Solutions, Inc., Russellville, AR (US)

( * ) Notice: Subject to any disclaimer, the term of this patent is extended or adjusted under 35 U.S.C. 154(b) by 0 days.

(21) Appl. No.: 17/065,366

(22) Filed: Oct. 7, 2020

(65) Prior Publication Data
US 2022/0105994 A1 Apr. 7, 2022

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC .... B60R 9/00; B60R 9/04; B60R 9/06; B60R 11/06; B60R 2011/004; B60R 2011/0066; B62D 33/0207
See application file for complete search history.

(56) References Cited

U.S. PATENT DOCUMENTS

| | | | | |
|---|---|---|---|---|
| 11,155,218 | B2* | 10/2021 | Morris | B60R 11/06 |
| 2005/0017038 | A1* | 1/2005 | Johnson | B60R 11/06 224/404 |
| 2009/0200823 | A1* | 8/2009 | Vertanen | B60P 3/423 296/26.08 |
| 2013/0001267 | A1* | 1/2013 | Infantino | B60R 9/045 224/539 |
| 2013/0200122 | A1* | 8/2013 | Elson | B60R 9/06 224/401 |
| 2017/0232906 | A1* | 8/2017 | Boguslawski | B60R 9/045 211/207 |

OTHER PUBLICATIONS

Office Action, Canadian Intellectual Property Office, Canadian Patent Application No. 3,097,878 (dated May 5, 2022).
"Kubota RTV RAC System (Brochure)," https://issuu.com/seizmik/docs/kubota_rtv_rac_system, Aug. 4, 2010 (Aug. 4, 2010) (Screenshots taken on Sep. 2, 2022).

* cited by examiner

*Primary Examiner* — Corey N Skurdal
(74) *Attorney, Agent, or Firm* — Richard Blakely Glasgow

(57) ABSTRACT

A cargo rack for a utility task vehicle that includes a cargo bed that is fastenable to a bed of a utility task vehicle and side supports that are fastenable both to the cargo bed of the cargo rack and to the utility task vehicle. The cargo rack has an up position and a down position when fastened to the bed of the utility task vehicle. The side supports are fastened to the cargo bed and to the utility task vehicle when the cargo rack is in the up position, but the cargo bed is fastened to the bed of the utility task vehicle without the side supports when the cargo rack is in the down position.

18 Claims, 28 Drawing Sheets

CARGO RACK FOR UTILITY TASK VEHICLE

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

A utility task vehicle (UTV) is a four-wheel drive off-road vehicle that is commonly referred to as a "side-by-side." A UTV typically includes a cab and a dump bed for hauling equipment and other objects. The space in both the cab and the dump bed of a UTV is quite limited, which poses a challenge for a UTV user needing to store a lot of tools and equipment in or on the UTV. It would therefore be desirable to develop a cargo rack for attaching to the dump bed of the UTV that has multiple positions and configurations to maximize storage space for the UTV user.

BRIEF SUMMARY OF THE INVENTION

The present invention is directed to a cargo rack for a UTV that includes a cargo bed fastenable to the bed of the UTV and side supports that are fastenable both to the cargo bed of the cargo rack and to the UTV. The cargo rack has an up position and a down position when fastened to the bed of the UTV. The side supports are fastened to the cargo bed and to the UTV when the cargo rack is in the up position, but the cargo bed is fastened to the bed of the UTV without the side supports when the cargo rack is in the down position.

These and other features, objects and advantages of the present invention will become better understood from a consideration of the following detailed description of the preferred embodiments and appended claims in conjunction with the drawings as described following:

DETAILED DESCRIPTION OF THE INVENTION

Figure 1:
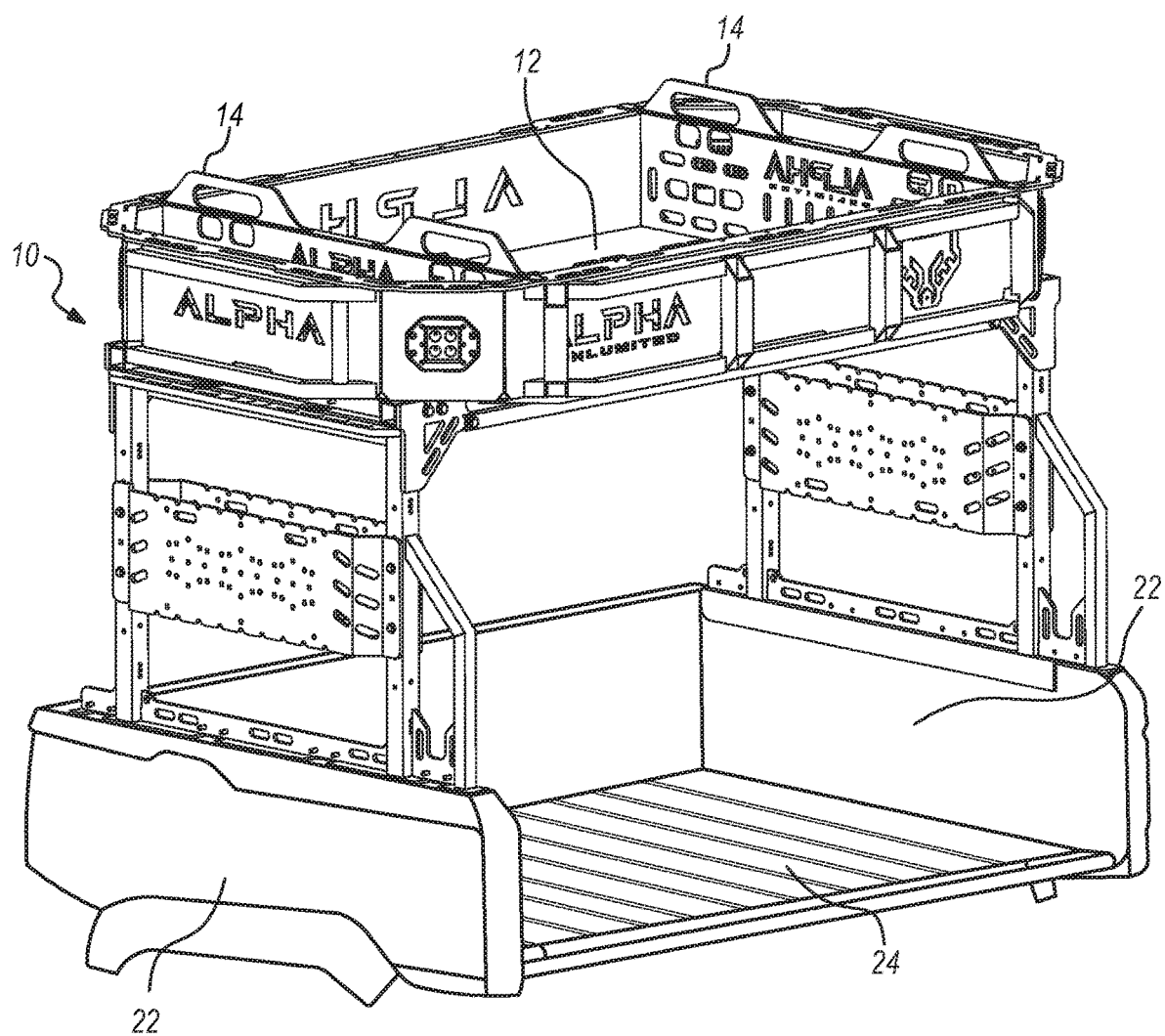
FIG. 1 is a back perspective view of one embodiment of the cargo rack of the present invention in the up position.

With reference to FIGS. 1-29, the preferred embodiments of the present invention may be described. The present invention is directed to a cargo rack 10 for a UTV. The cargo rack 10 includes a cargo bed 12. The cargo rack 10 also may include one or more dividers 14, one or more side supports 16, one or more side panels 18, and a headache rack 20.

Figure 2:
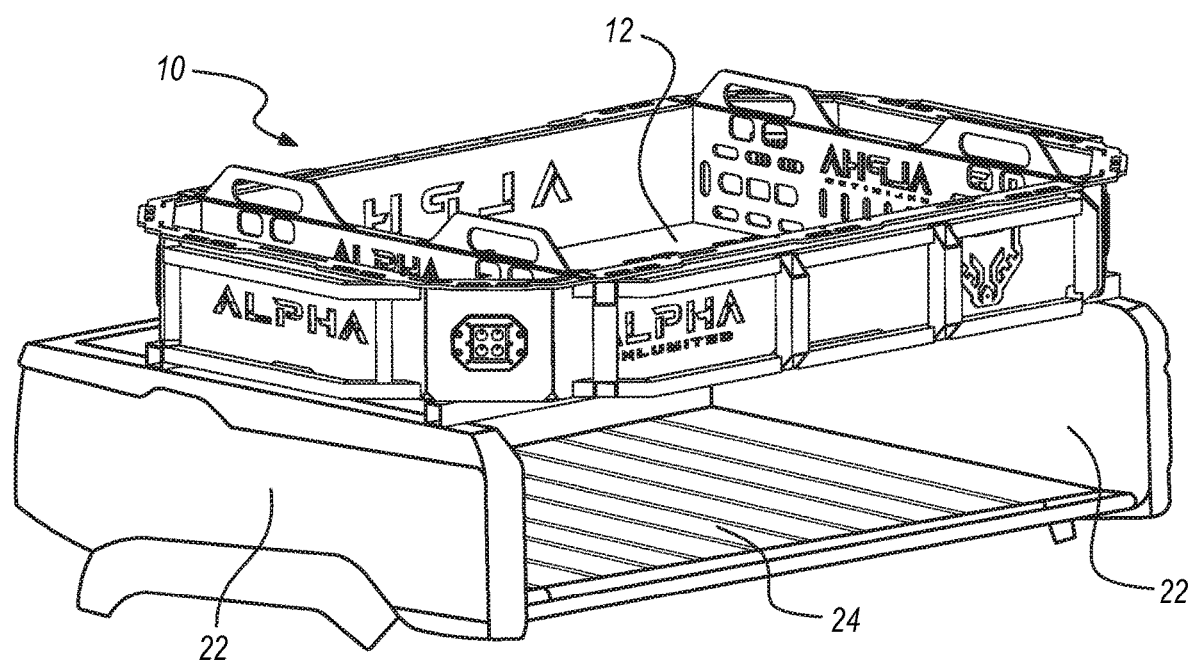
FIG. 2 is a back perspective view of one embodiment of the cargo rack of the present invention in the down position.
Figure 3:
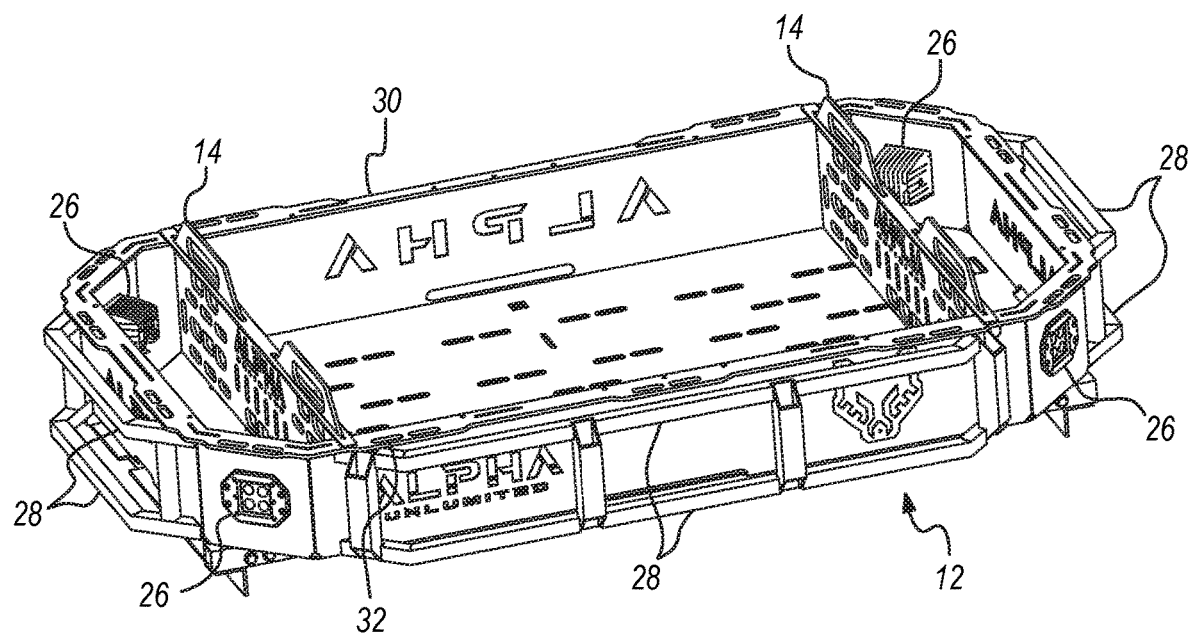
FIG. 3 is a top perspective view of the bed of the cargo rack of the present invention.
Figure 4:
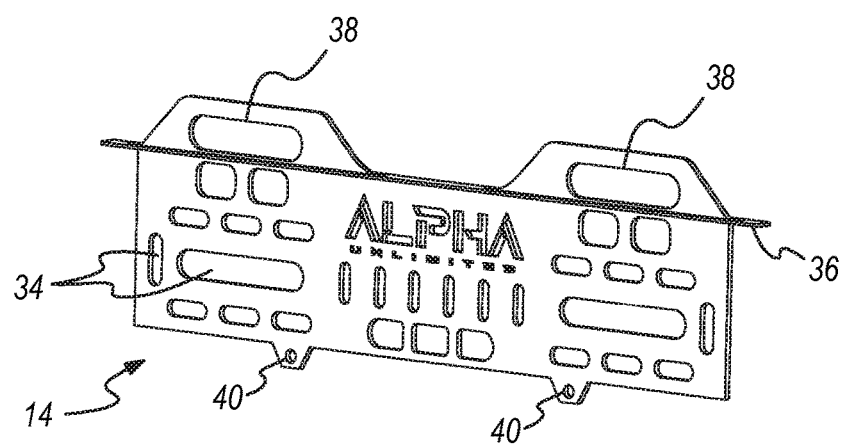
FIG. 4 is a perspective view of the divider of the cargo rack of the present invention.
Figure 5:
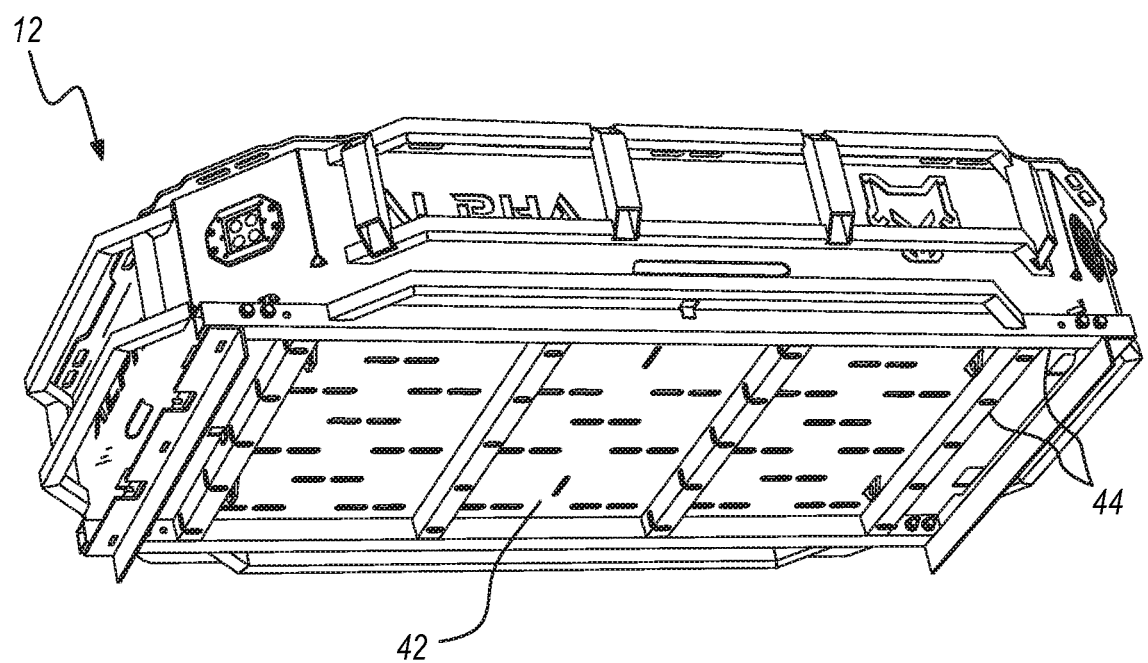
FIG. 5 is a bottom perspective view of the bed of the cargo rack of the present invention.
Figure 6:
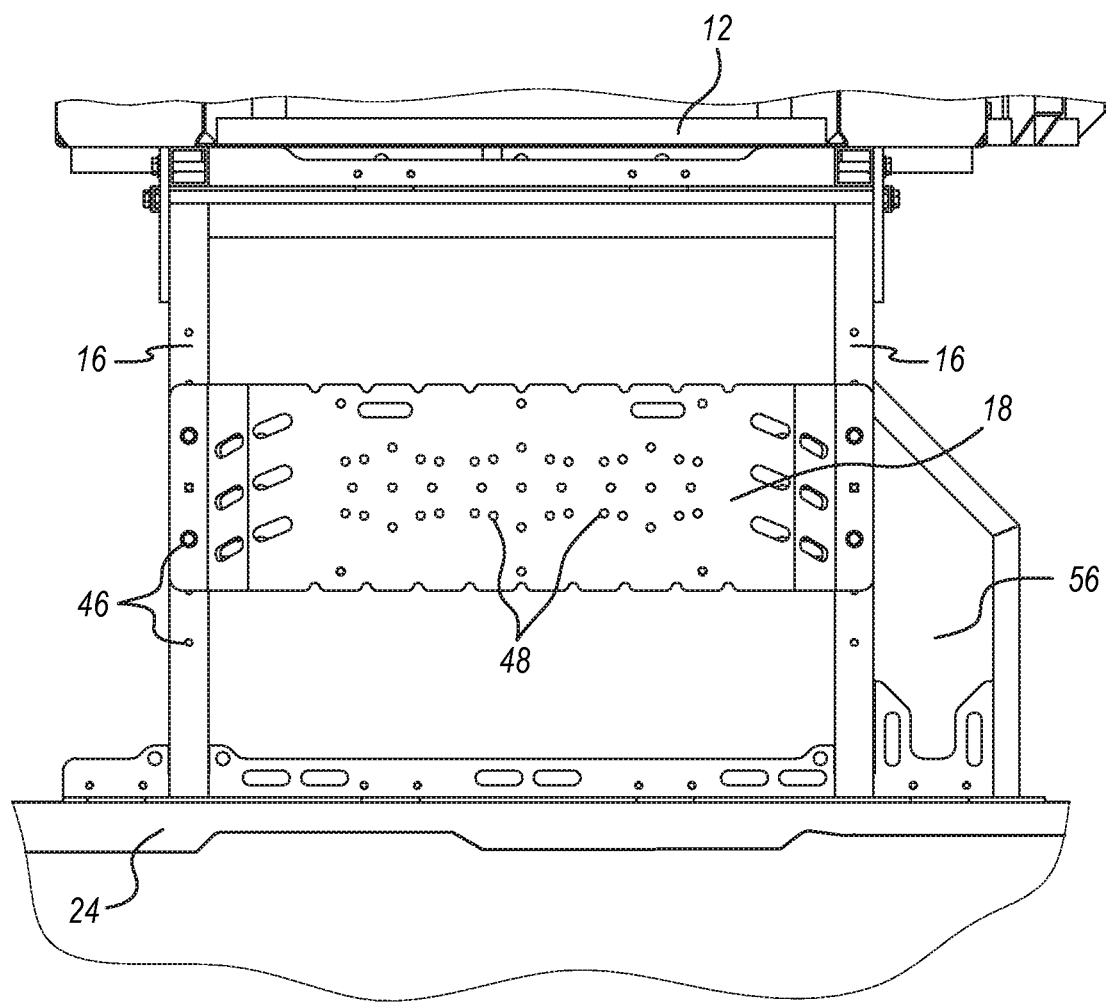
FIG. 6 is a side view of one embodiment of the cargo rack of the present invention.
Figure 7:
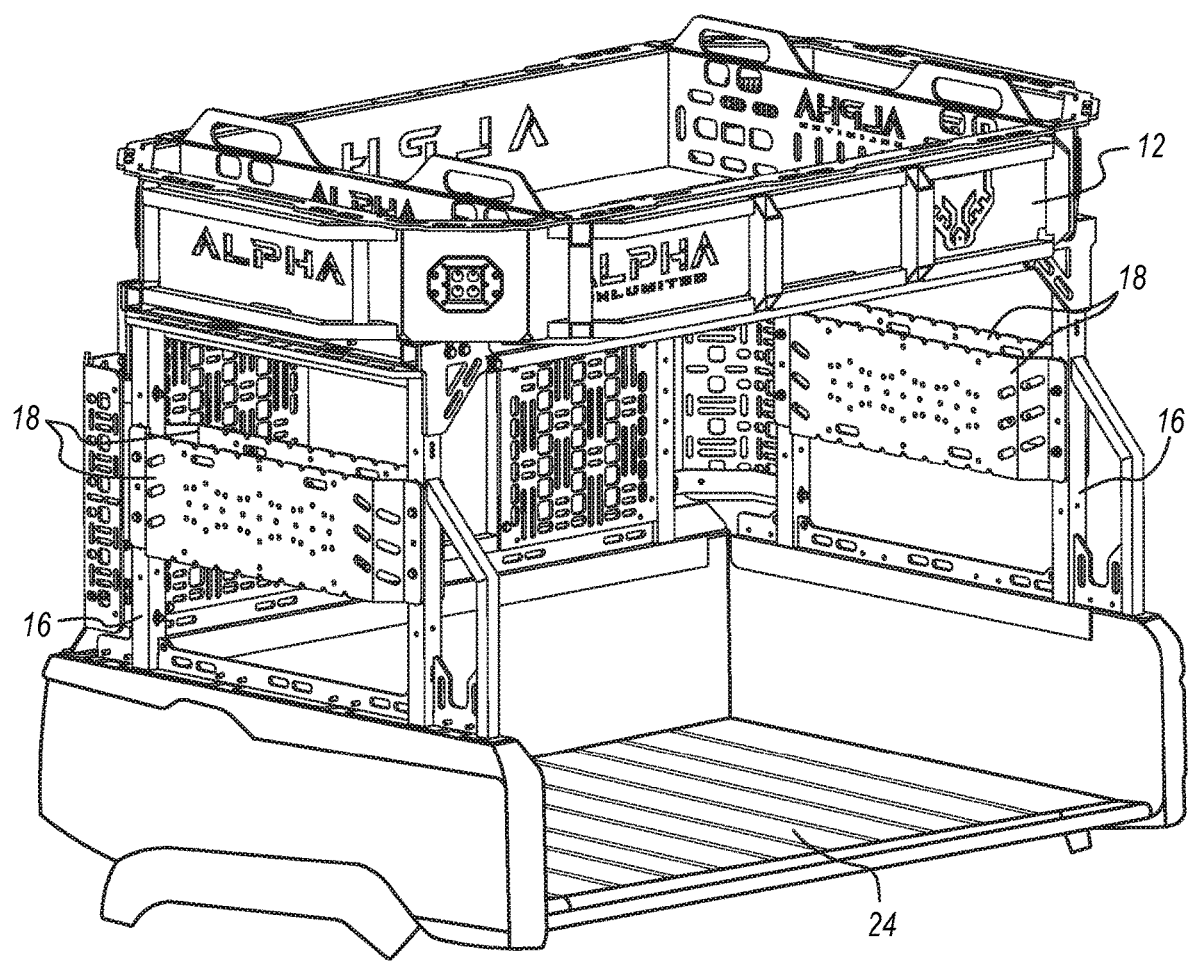
FIG. 7 is a back perspective view of one embodiment of the cargo rack of the present invention in the up position.

The cargo rack 10 is attachable to the sides 22 of the stock dump bed 24 of the UTV. The cargo rack 10 may be raised and lowered. In this regard, the cargo rack 10 has an up position, as shown in FIG. 1, and a down position, as shown in FIG. 2. The cargo rack 10 is in the up position when the bed 12 is positioned high above the sides 22 of UTV's dump bed 24. The cargo rack 10 is in the down position when the bed 12 is positioned slightly above the sides 22 of the UTV's dump bed 24.

The cargo bed 12 preferably has an octagonal shape. The angled corners of the bed 12 aid in limb and debris deflection. The bed 12 also has light cut-outs in the angled corners of the exterior of the bed 12 for LED lights 26. The LED lights 26 offer the user of the UTV added visibility in low or no light conditions. Standoff tubes 28 extend from the sides and back of the bed 12, which assist in further deflecting limbs, objects and debris, provide hand holds for accessing the interior of the UTV's dump bed 24 and the bed 12 of the cargo rack 10, act as a handle for actuating the UTV's dump bed 24, and allow tools, gear and equipment to be hung over and secured to the side of bed 12. The standoff tubes 28, like the rest of the cargo rack 10, are preferably made of ferrous or non-ferrous metal. The top plate of the bed 12 that forms the perimeter of the bed 12 also has multiple hook or tie-off points 32 so that gear stored in the bed 12 can be secured while the UTV traverses any terrain.

In some embodiments of the cargo rack 10, one or more dividers 14 are positioned within the interior of the bed 12, as shown in FIG. 2. The dividers 14 are preferably elongated metal panels that divide the interior of the bed 12 into multiple bed compartments. The dividers 14 allow the UTV user to configure the interior of the bed 12 to allow gear, tools and equipment to be separated, organized and stored quickly and easily. The body of the dividers 14 includes a plurality of oval shape openings 34 of different sizes. Some of the openings 34 preferably are oriented horizontally and some of the openings preferably are oriented vertically. Straps or other tie-downs may pass through the openings 34 to secure gear and equipment in the bed 12. In combination, the openings 34 also reduce the overall weight of the divider 14. The dividers may be quickly and easily installed, removed, and relocated. The dividers include a top plate 36 that is longer than the rest of the dividers. The top plate 36 of the divider 12 fastens to the top plate of the bed 12. In one embodiment, the two ends of the top plate are attached to the top plate of the bed via quick release fasteners that would be well-known to a person of ordinary skill in the art. In an alternative embodiment, the two ends of the top plate are attached to the top plate of the bed with conventional fasteners (e.g., bolt, washer, and hex nut). Two handles 38 are joined at opposite ends of the top plate 36. Two roughly triangular shaped projections 40 extend from the bottom of the dividers 14. The projections 40 slide through slots in the bottom 42 of the bed 12. The bed 12 preferably has slots to receive the dividers 14 in three different positions: left side of the bed ("left position"), right side of the bed ("right position"), and the middle of the bed ("middle position"). Thus, the dividers 14 may be used in combination to create different size bed compartments. For example, in FIG. 3, the dividers are in the left position and the right position and the bed is divided into three bed compartments. Openings that extend through the projections 40 provide additional tie-off points below the bed when the cargo rack 10 is in the up position.

The bottom 42 of the bed 12 is supported by a frame 44. The frame 44 includes lengthwise and widthwise tubular supports. When the cargo rack 10 is in the down position, the frame 44 attached to the bottom of the bed 12 is attached to the sides of the dump bed 24 of the UTV by quick release fasteners that would be well-known to those skilled in the art. For example, because different manufacturers of UTVs utilize different fasteners for add-on products (e.g., Polaris LOCK & RIDE® fastener), the fasteners used in the cargo rack 10 correspond to the UTV manufacturer to which the cargo rack will be attached. The frame 44 has hook or tie-off points which allows tools, equipment and gear to be secured, stored or suspended in various configurations.

The cargo rack 10 also includes side supports 16 that are connected to the frame of the bed 12 and to the sides of the dump bed 24 of the UTV. In one embodiment, there are two supports 16 on each side of the cargo rack 10. The supports 16 raise the bed 12 above the dump bed 24 when the cargo rack 10 is in the up position. The side supports 16 are connected to the frame of the bed of the cargo rack and to the bed of the UTV via quick release fasteners. The supports 16 have multiple hook or tie-off points to allow tools, equipment and gear to be hung, suspended or secured from in desired configurations. The supports 16 include handles 56 facing the rear of the UTV to assist users accessing the dump bed 24 of the UTV or the cargo rack 10.

The use of quick release fasteners allows the cargo rack 10 to be converted from the up position to the down position quickly and easily. First, the fasteners connecting the side supports 16 to the sides 22 of the dump bed 24 of the UTV are disengaged so that the cargo rack 10 (with the bed 12 and the side supports 16) may be removed from the dump bed 24. Second, the fasteners connecting the side supports 16 and the frame 44 under the bed 12 are disengaged so that the side supports 16 are separated from the bed 12. Third, the bed 12 is placed on the sides 22 of the dump bed 24 of the UTV and the fasteners on the frame 44 are engaged with the mounts on the sides 22 of the dump bed 24.

The use of quick release fasteners also allows the cargo rack 10 to be converted from the down position to the up position quickly and easily. First, the fasteners connecting the frame 44 under the bed 12 to the sides 22 of the dump bed 24 are disengaged so that the bed 12 may be removed from the dump bed 24. Second, the side supports 16 are fastened to the frame 44 attached to the bed 12. Third, the bed 12 with the side supports 16 is placed on top of the sides 22 of the dump bed 24 of the UTV and the side supports 16 are fastened to the sides 22 of the dump bed.

Figure 15:
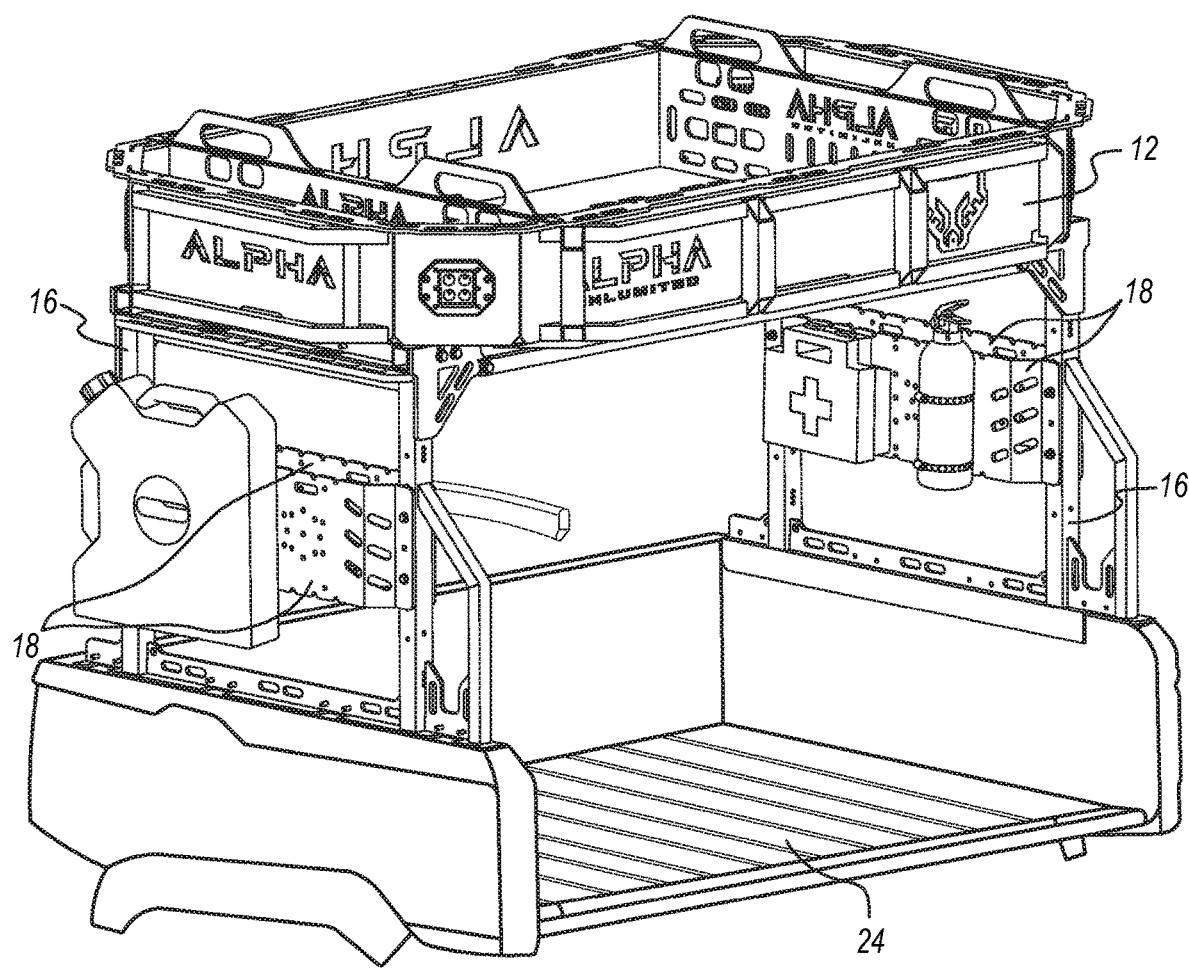
FIG. 15 is a back perspective view of one embodiment of the cargo rack of the present invention in the up position.
Figure 16:
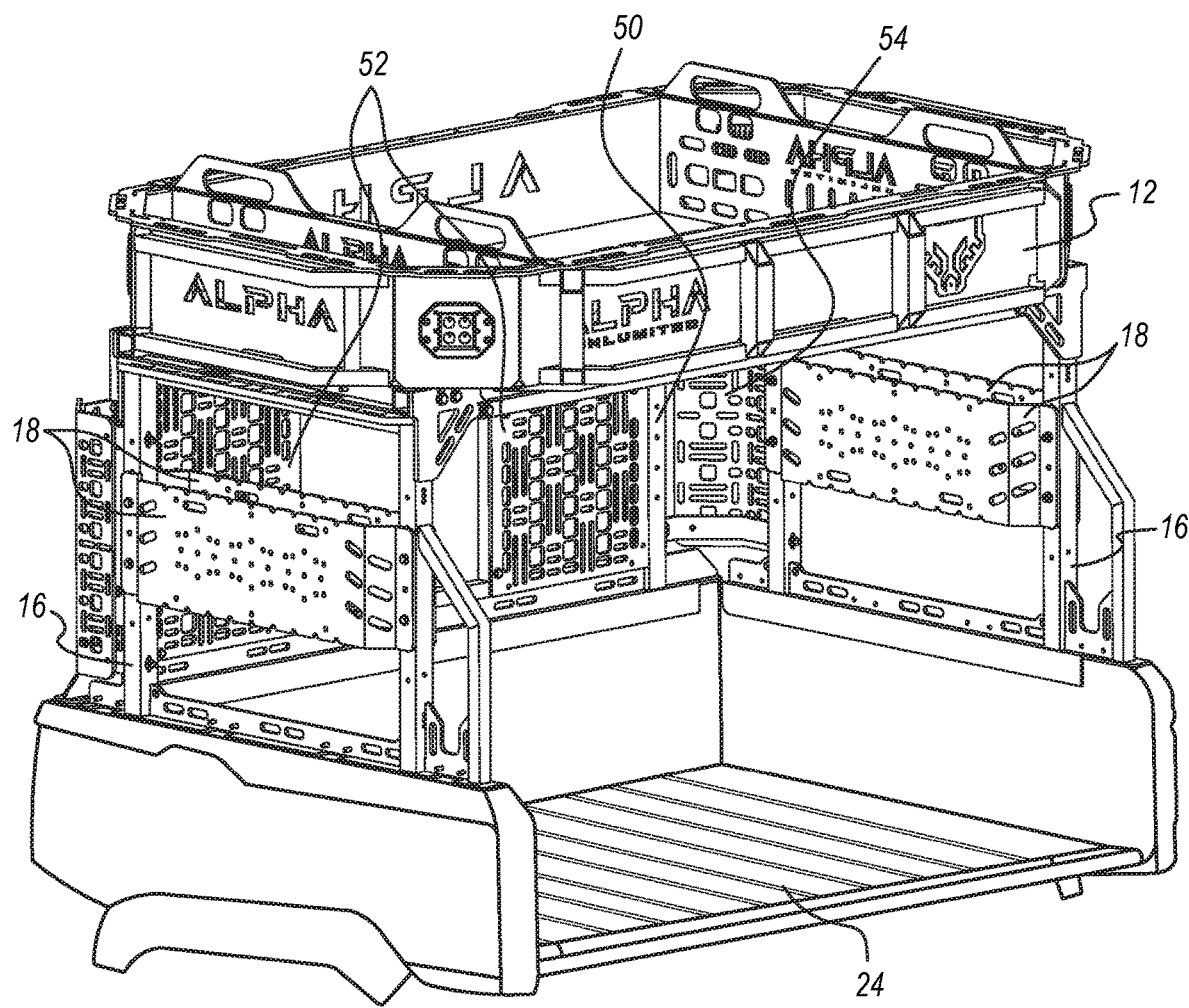
FIG. 16 is a back perspective view of one embodiment of the cargo rack of the present invention in the up position.

Side panels 18 may be attached to the side supports 16 along the left and right sides of the cargo rack 10. One or more panels may be attached to either or both sides of the supports 16 in different configurations as described below depending on the particular needs of the UTV user. In one embodiment, the panel 18 includes flat bracket sections on opposite ends of the panel that are secured to the side supports. The bracket sections are joined to curved sections. The curved sections of the panels 18 are joined to opposite ends of a flat middle section. The panels may be mounted in different mounting holes 46 spaced along the length of the supports 16, which allows the panels to be adjusted vertically based on the needs of the user. The face of the panels includes mounting holes 48 that are compatible with mounting plates that hold different securing attachments. The mounting plates allow the user to attach items such as gas cans, water cans, storage cans, shovels, axes, spare tires, hand tools, fire extinguishers, first aid kits and other miscellaneous items to the side of the rack in various configurations, as shown in FIG. 15. The panels 18 have multiple hook and tie-off points that allow straps, carabiner clips, ropes, tools, gear and equipment to be hung, secured or suspended.

Figure 17:
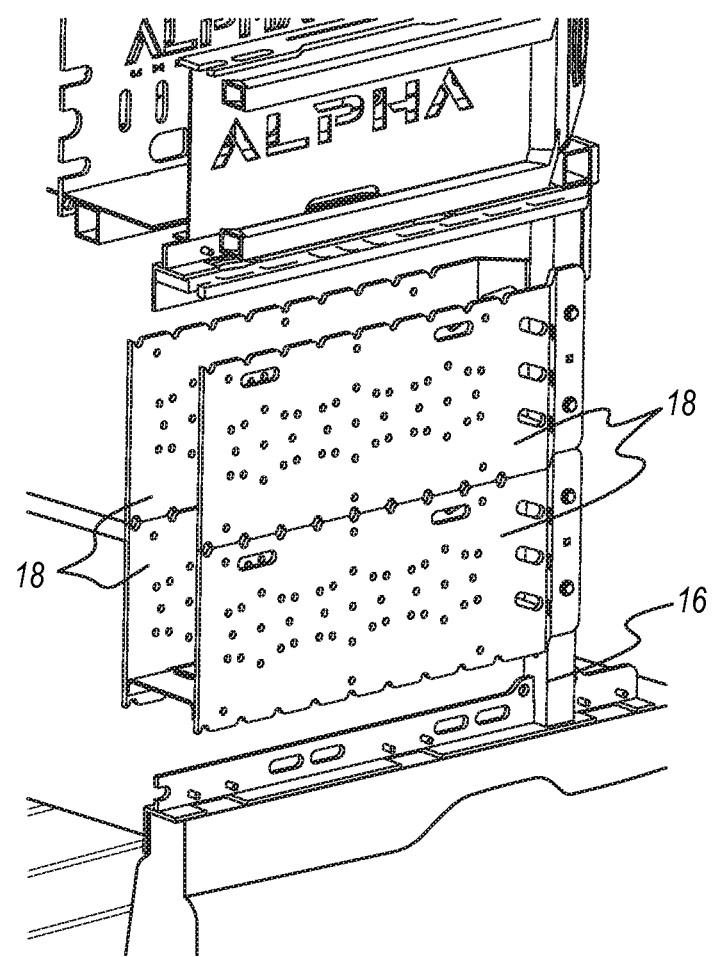
FIG. 17 is a partial side perspective view of four side panels of the cargo rack of the present invention.
Figure 22:
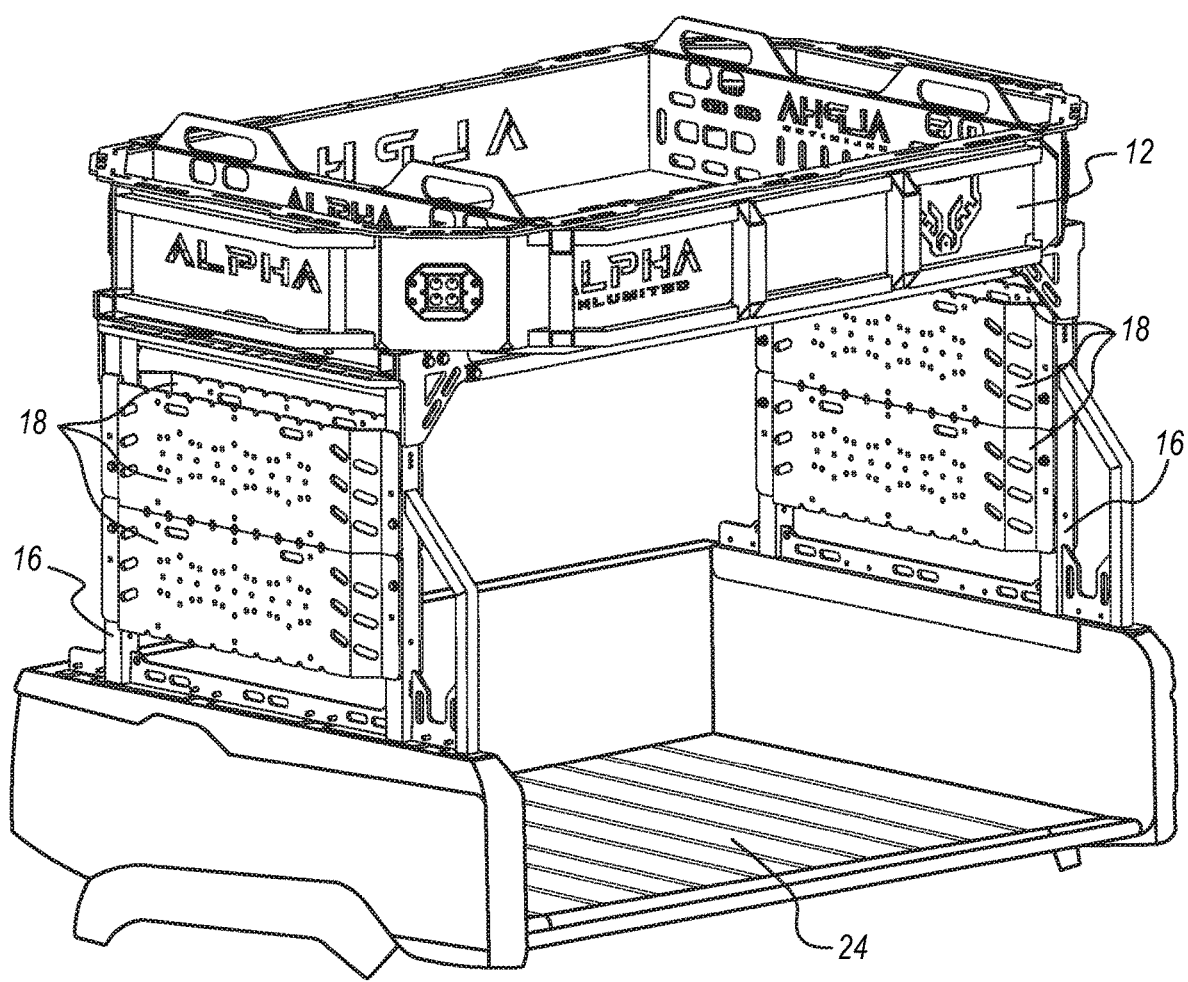
FIG. 22 is a back perspective view of one embodiment of the cargo rack of the present invention in the up position.
Figure 23:
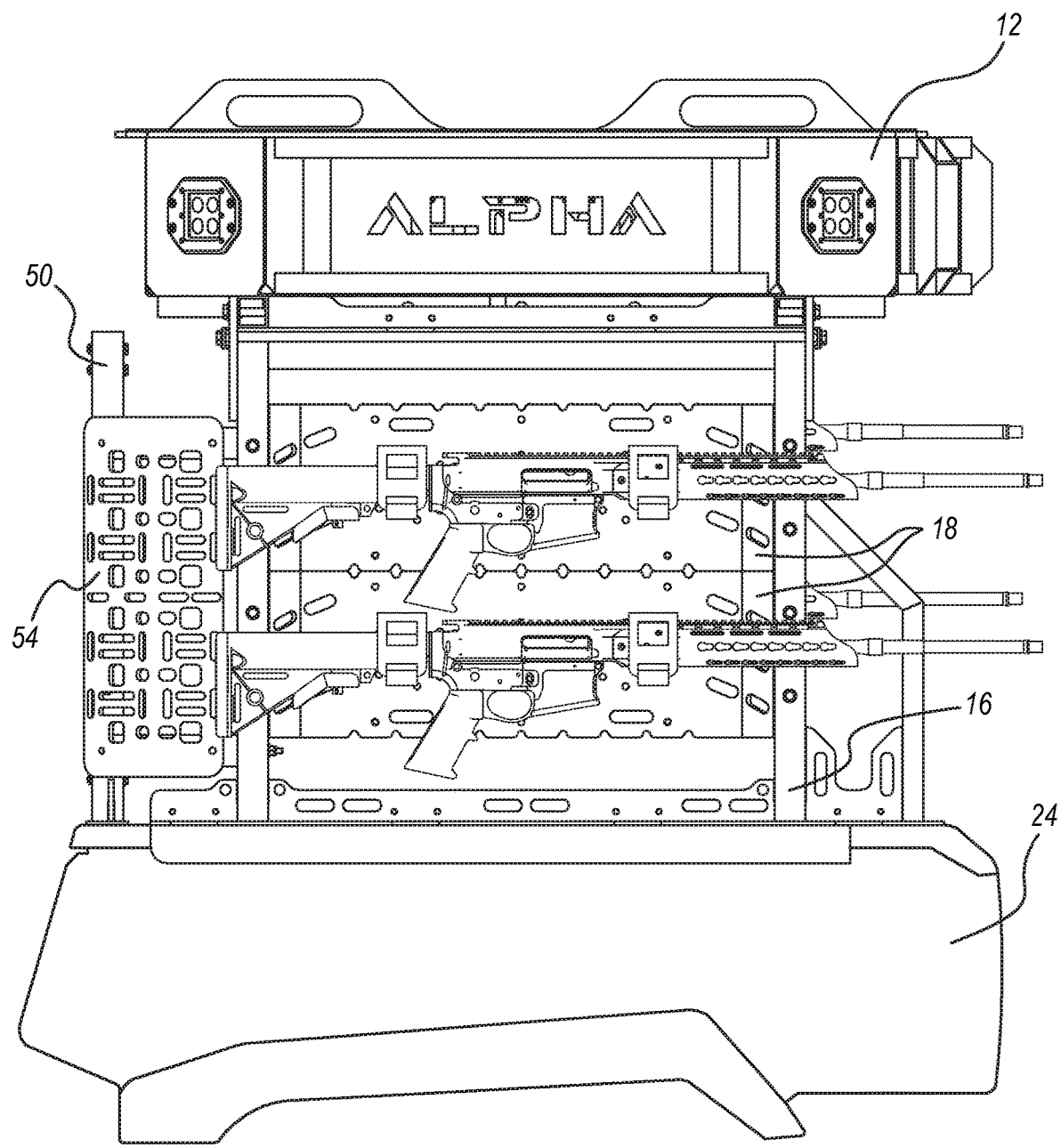
FIG. 23 is a side view of one embodiment of the cargo rack of the present invention in the up position.

When two panels are combined (one panel 18 fastened to the inside of the supports 16 and one panel 18 fastened to the outside of the supports 16), a small storage compartment is created that allows the user to conveniently and securely store items (e.g., ammunition, off-road recovery equipment, dog training gear, hand tools, and many other small miscellaneous items) between the supports on that particular side of the cargo rack 10, as shown in FIGS. 7 and 12-17. When two panels are combined, a separate plate is positioned horizontally between the two panels to form the floor of the small storage compartment. Four panels may be combined (two panels fastened to the inside of the supports and two panels fastened to the outside of the supports) to produce a larger storage compartment for larger items, as shown in FIGS. 17 and 22. Similarly, a separate plate is positioned horizontally between each of the two facing panels to form the floor of the larger storage compartment.

Figure 8:
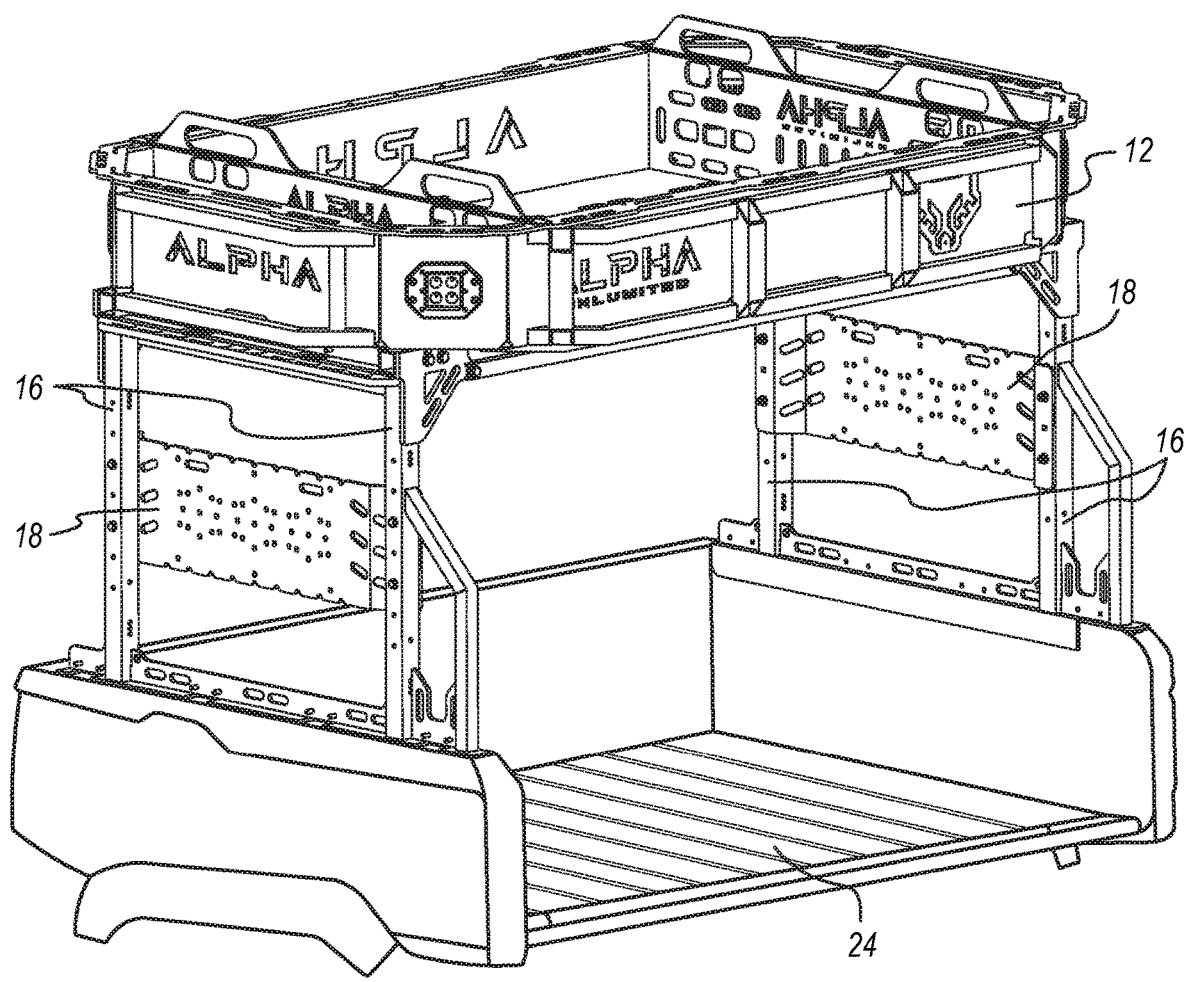
FIG. 8 is a back perspective view of one embodiment of the cargo rack of the present invention in the up position.
Figure 9:
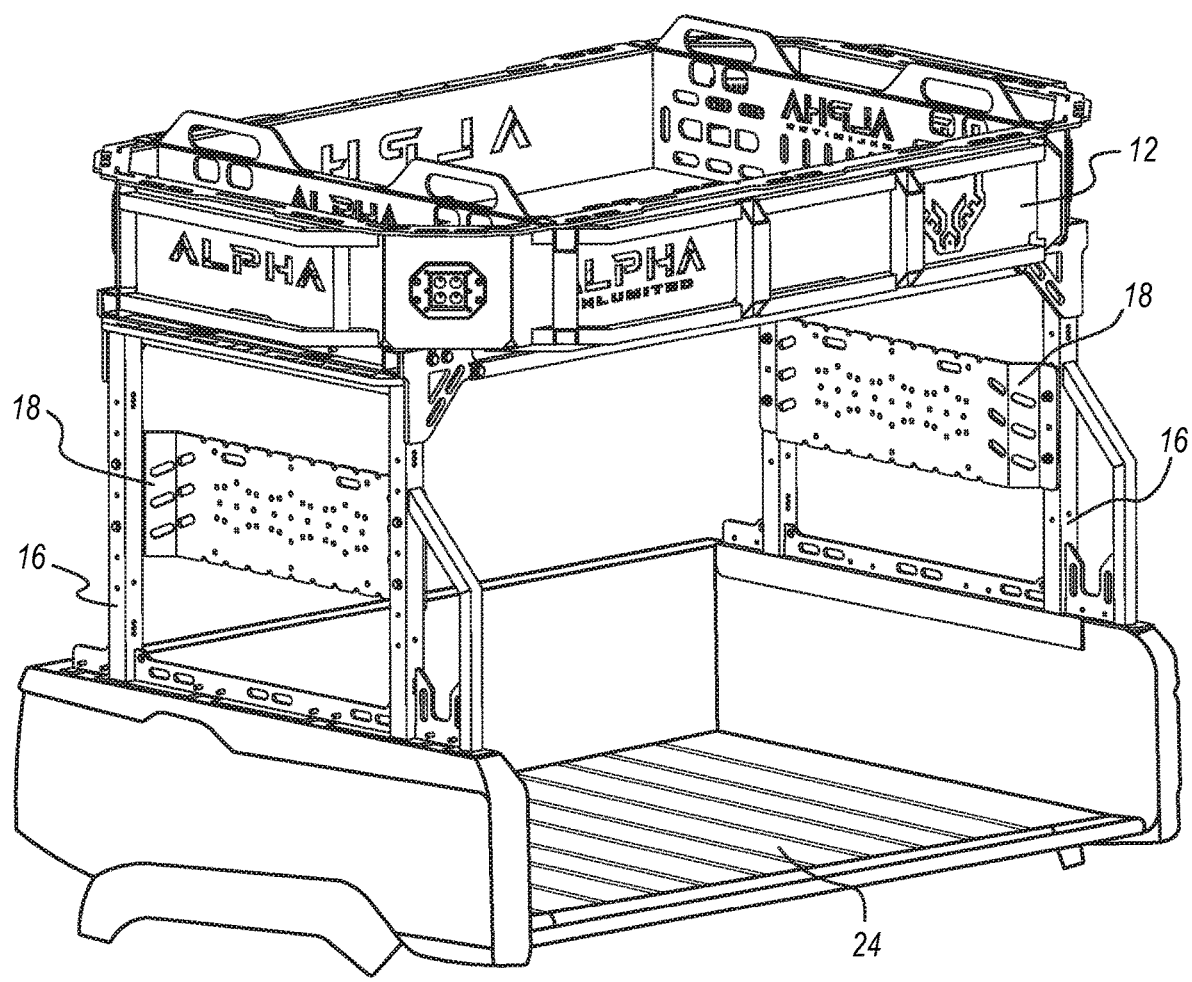
FIG. 9 is a back perspective view of one embodiment of the cargo rack of the present invention in the up position.
Figure 10:
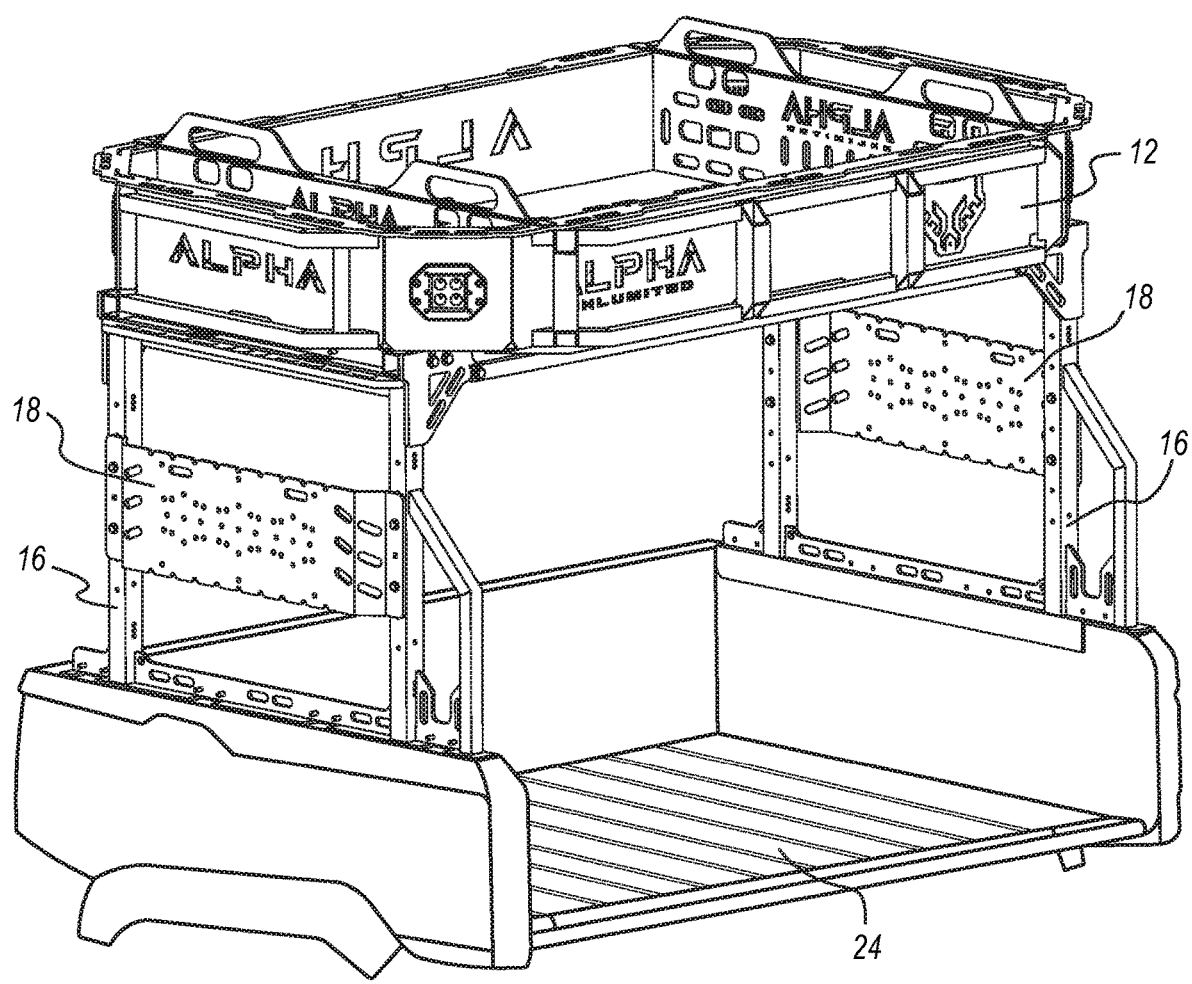
FIG. 10 is a back perspective view of one embodiment of the cargo rack of the present invention in the up position.
Figure 11:
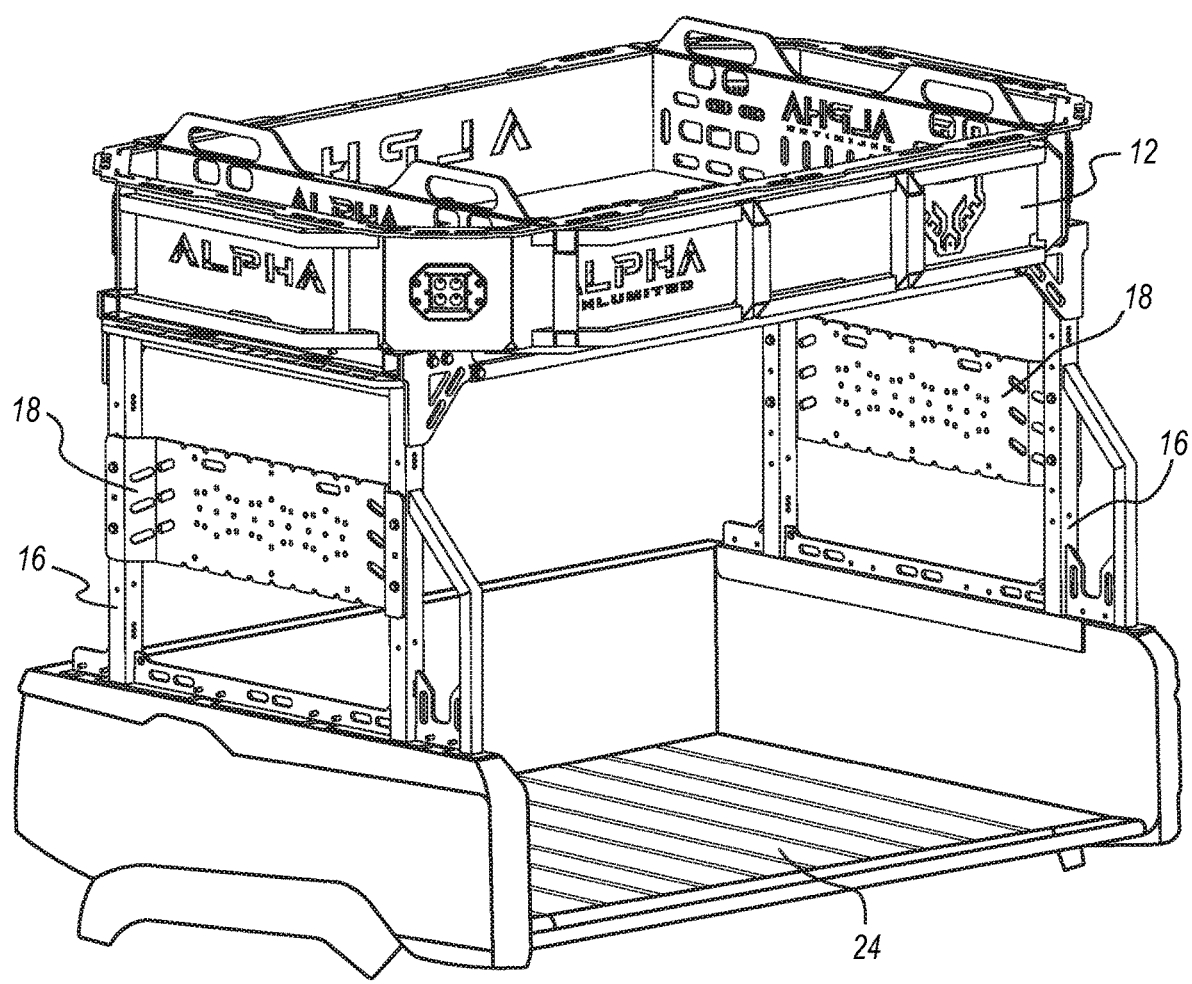
FIG. 11 is a back perspective view of one embodiment of the cargo rack of the present invention in the up position.
Figure 12:
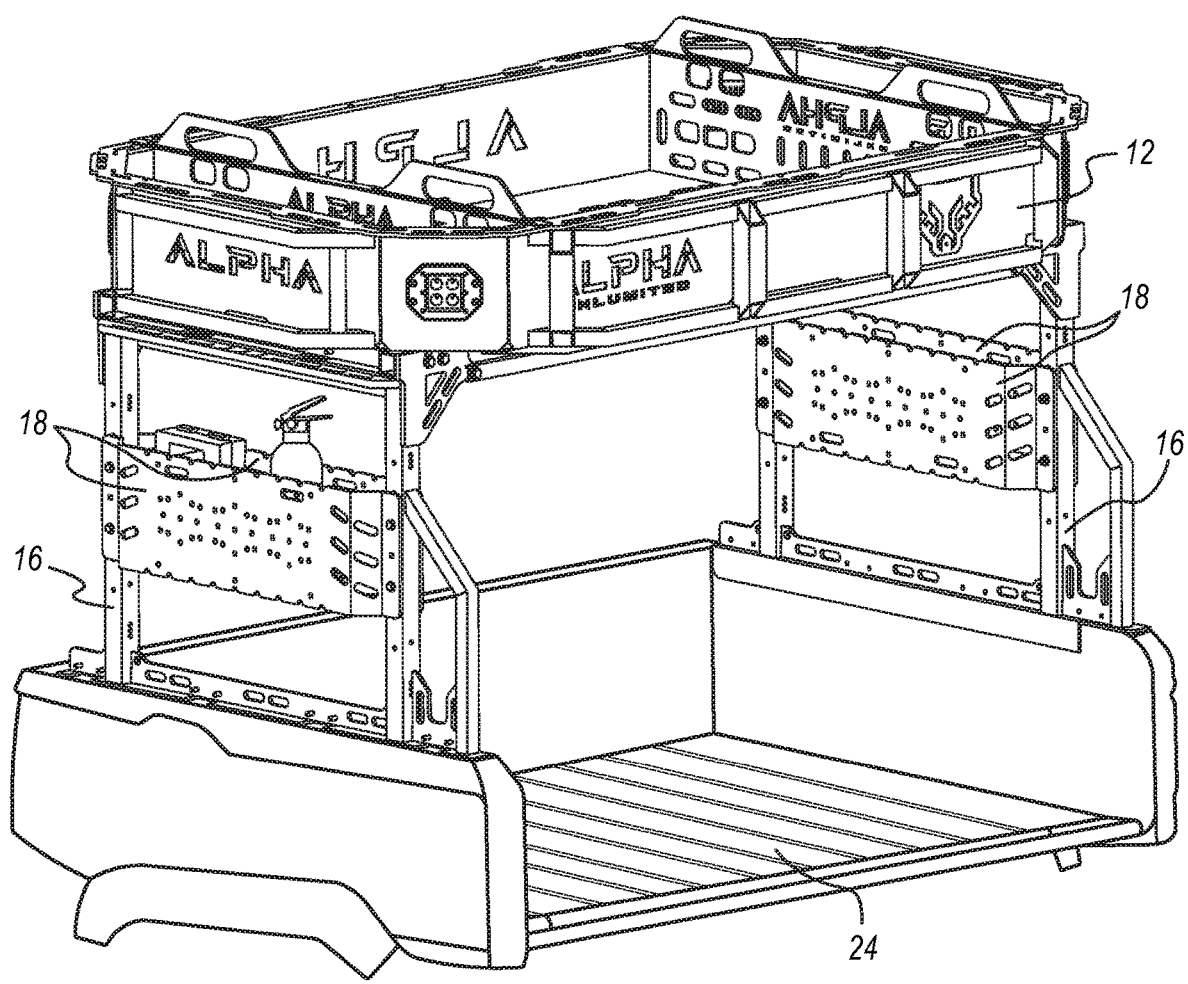
FIG. 12 is a back perspective view of one embodiment of the cargo rack of the present invention in the up position.
Figure 13:
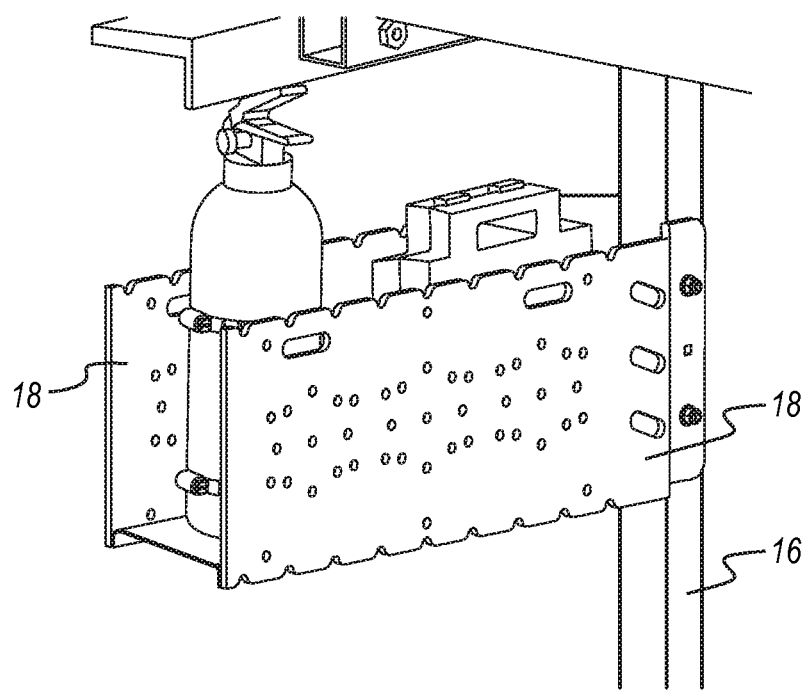
FIG. 13 is partial front prospective view of two side panels of the cargo rack of the present invention containing a fire extinguisher and a first aid kit.
Figure 14:
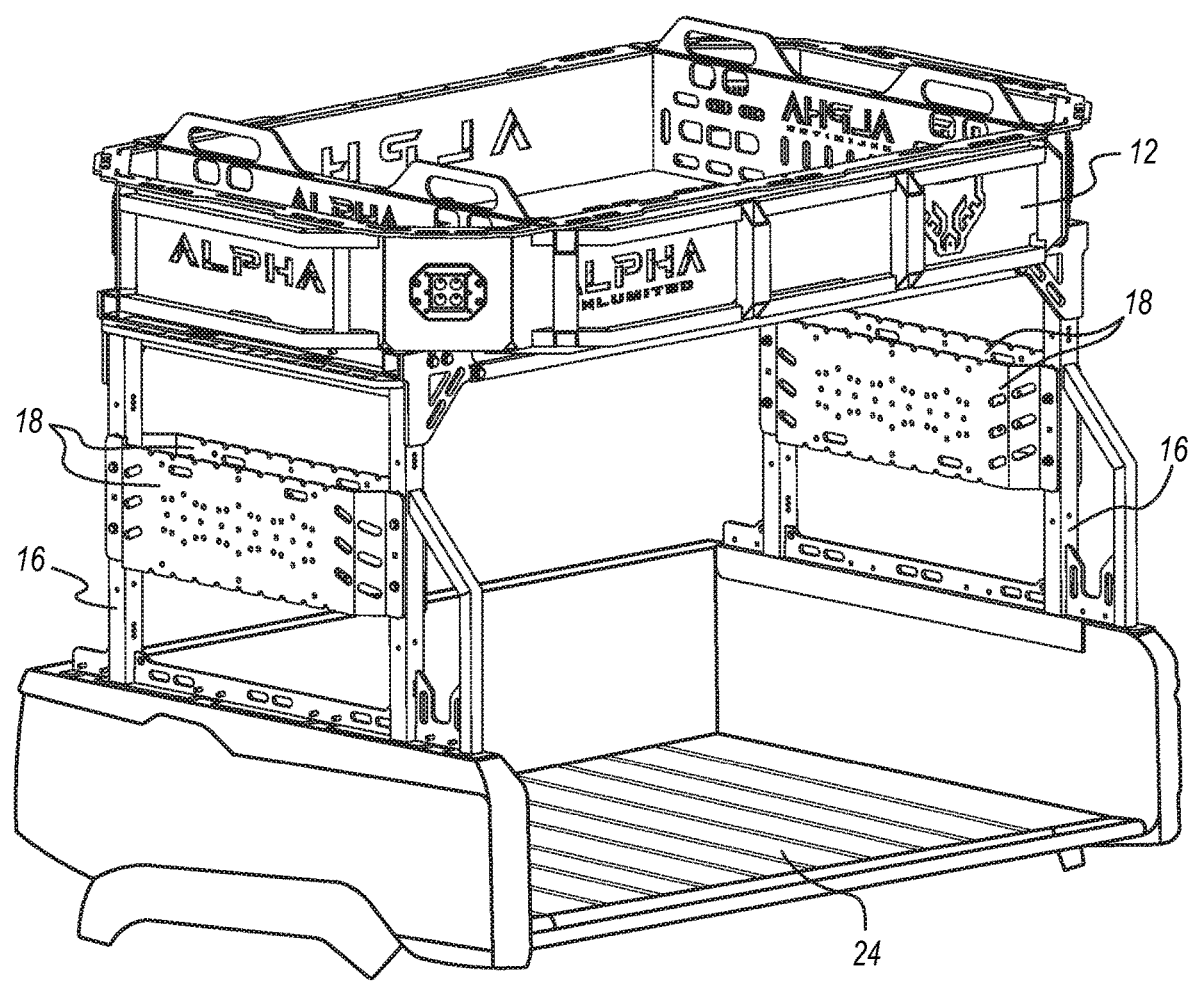
FIG. 14 is a back perspective view of one embodiment of the cargo rack of the present invention in the up position.

FIG. 8 shows a single panel 18 mounted to the inside of the supports 16 on both sides of the cargo rack 10. The panel 18 on the left side of the cargo rack 10 extends towards the right side of the cargo rack 10, and the panel 18 on the right side of the cargo rack 10 extends away from the left side of the cargo rack 10. FIG. 9 shows a single panel 18 mounted to the inside of the supports 16 on both sides of the cargo rack 10. The panel on the left side of the cargo rack 10 extends towards the right side of the cargo rack 10, and the panel 18 on the right side of the cargo rack 10 extends towards the left side of the cargo rack 10. FIG. 10 shows a single panel 18 mounted to the outside of the supports 16 on both sides of the cargo rack 10, and the panels 18 extend away from each other. FIG. 11 shows a single panel 18 mounted to the outside of the supports 16 on both sides of the cargo rack 10. The panel 18 on the left side of the cargo rack 10 extends towards the right side of the cargo rack 10, and the panel 18 on the right side of the cargo rack extends away from the left side of the cargo rack 10.

Figure 18:
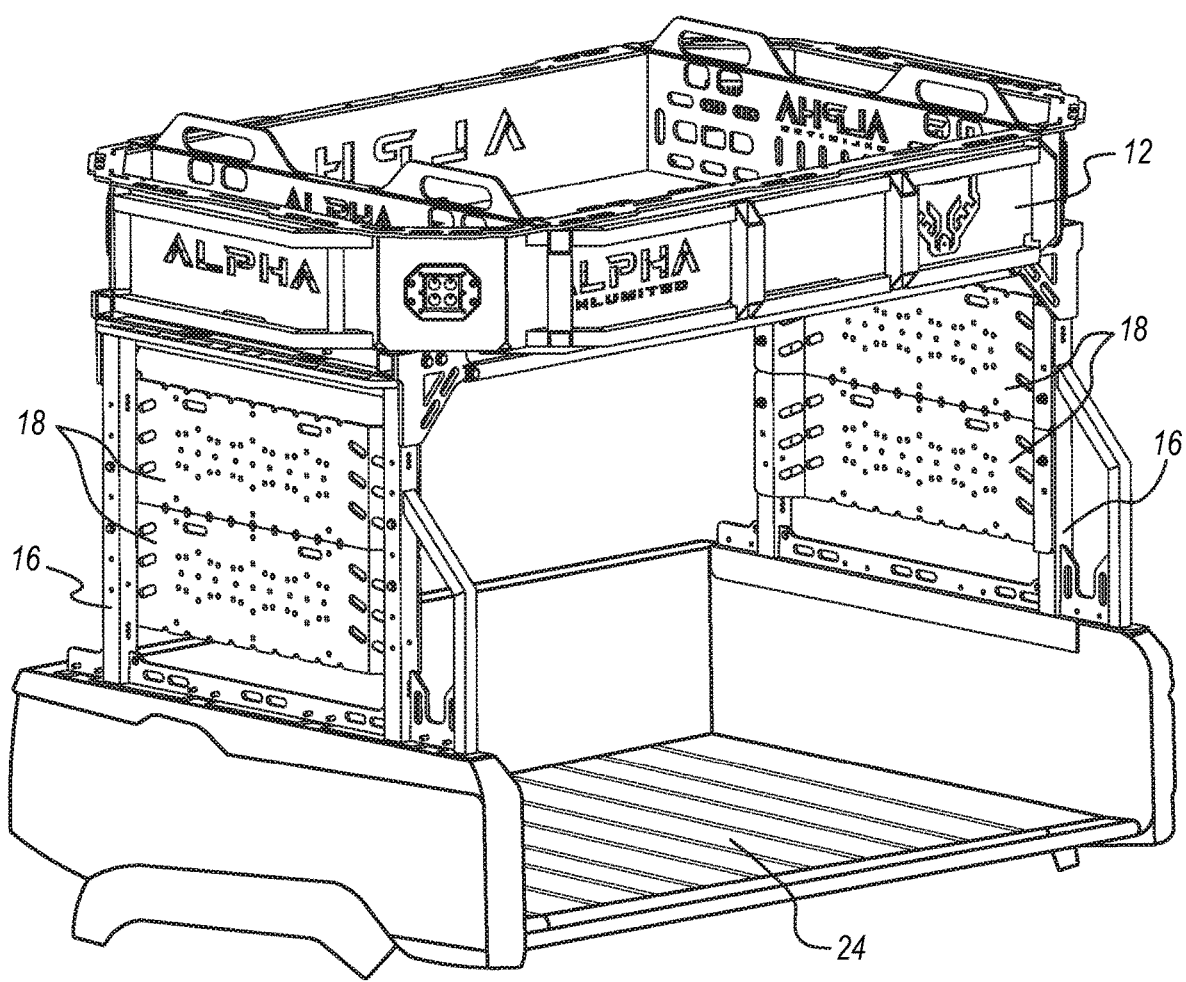
FIG. 18 is a back perspective view of one embodiment of the cargo rack of the present invention in the up position.
Figure 19:
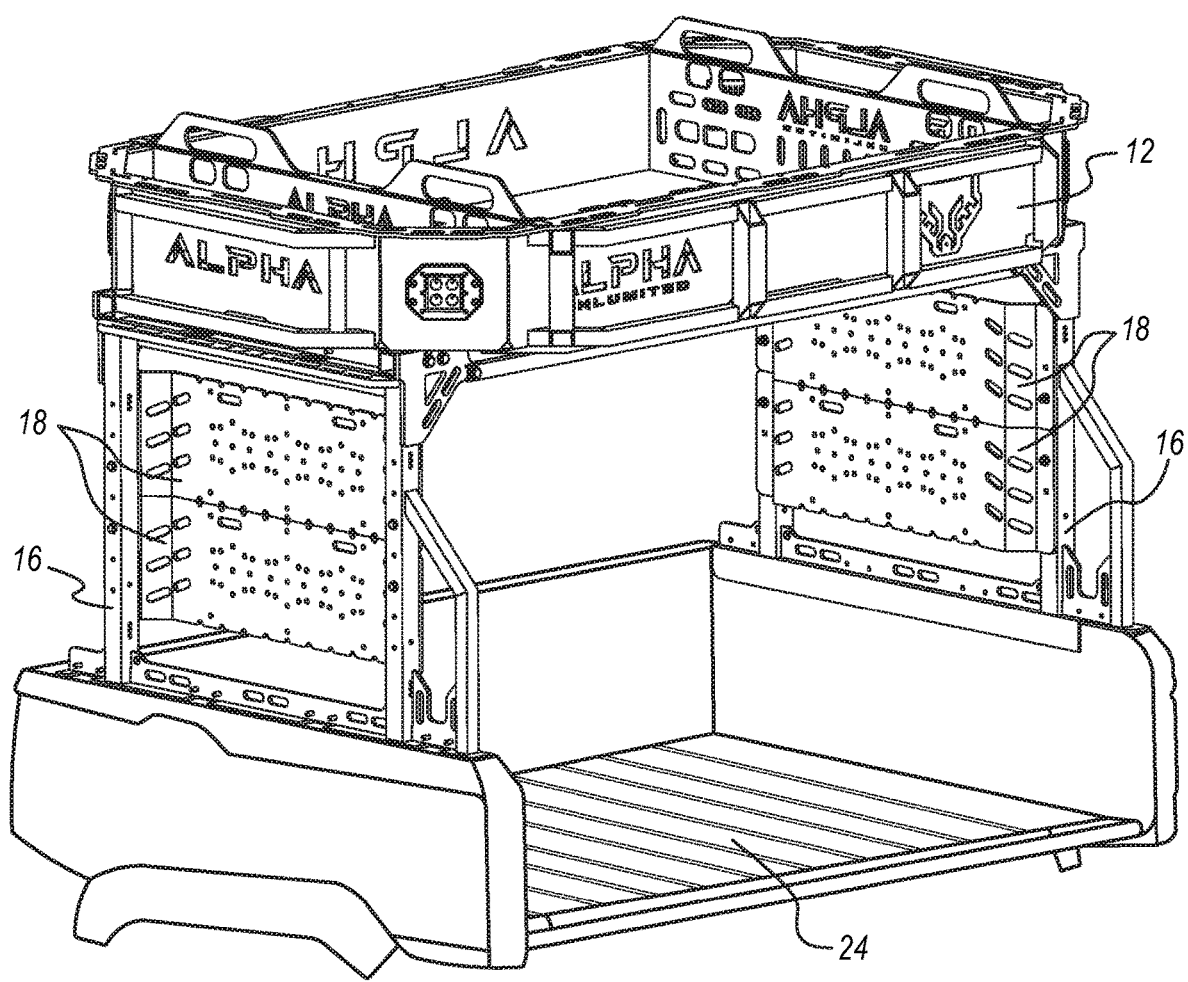
FIG. 19 is a back perspective view of one embodiment of the cargo rack of the present invention in the up position.
Figure 20:
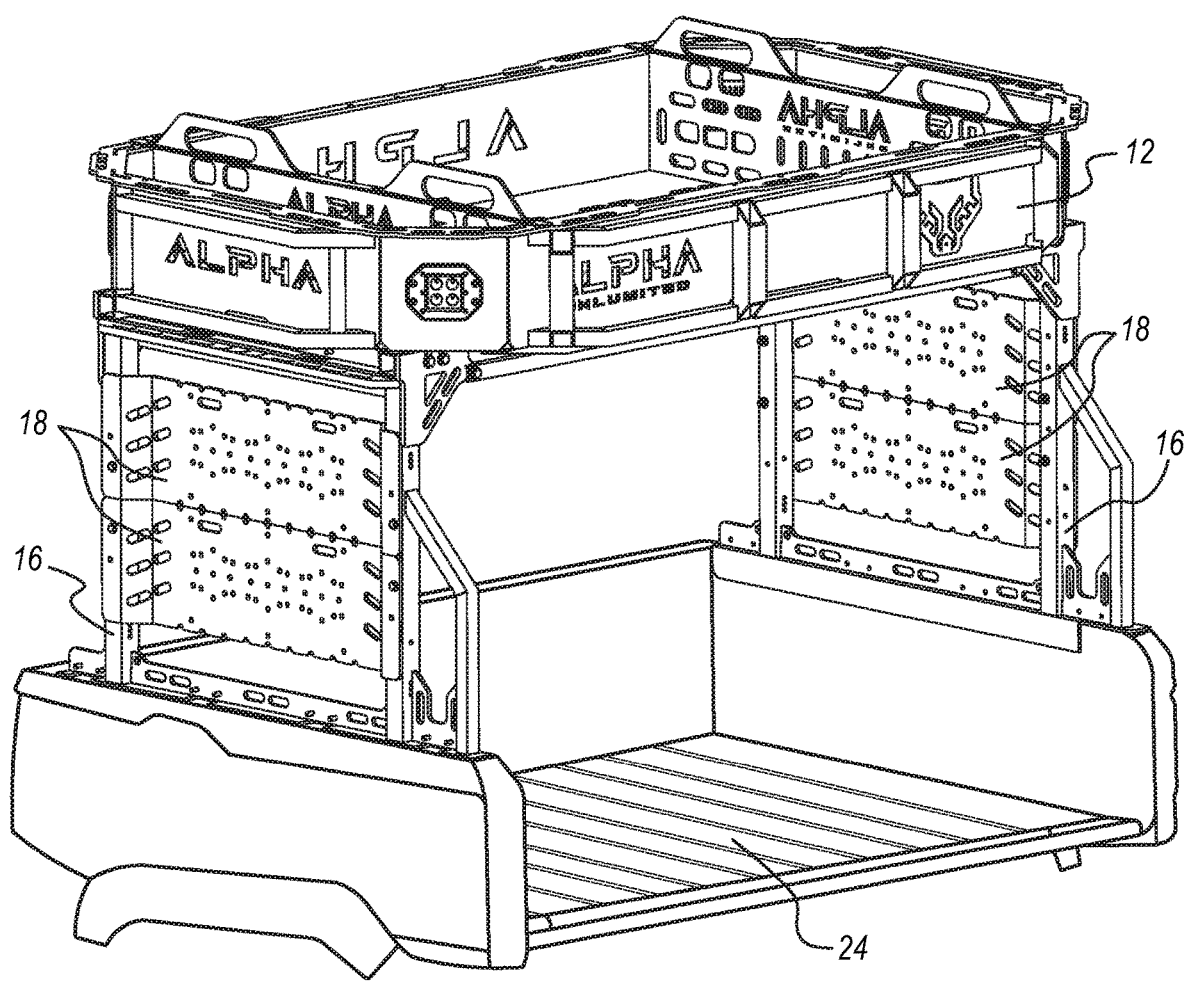
FIG. 20 is a back perspective view of one embodiment of the cargo rack of the present invention in the up position.
Figure 21:
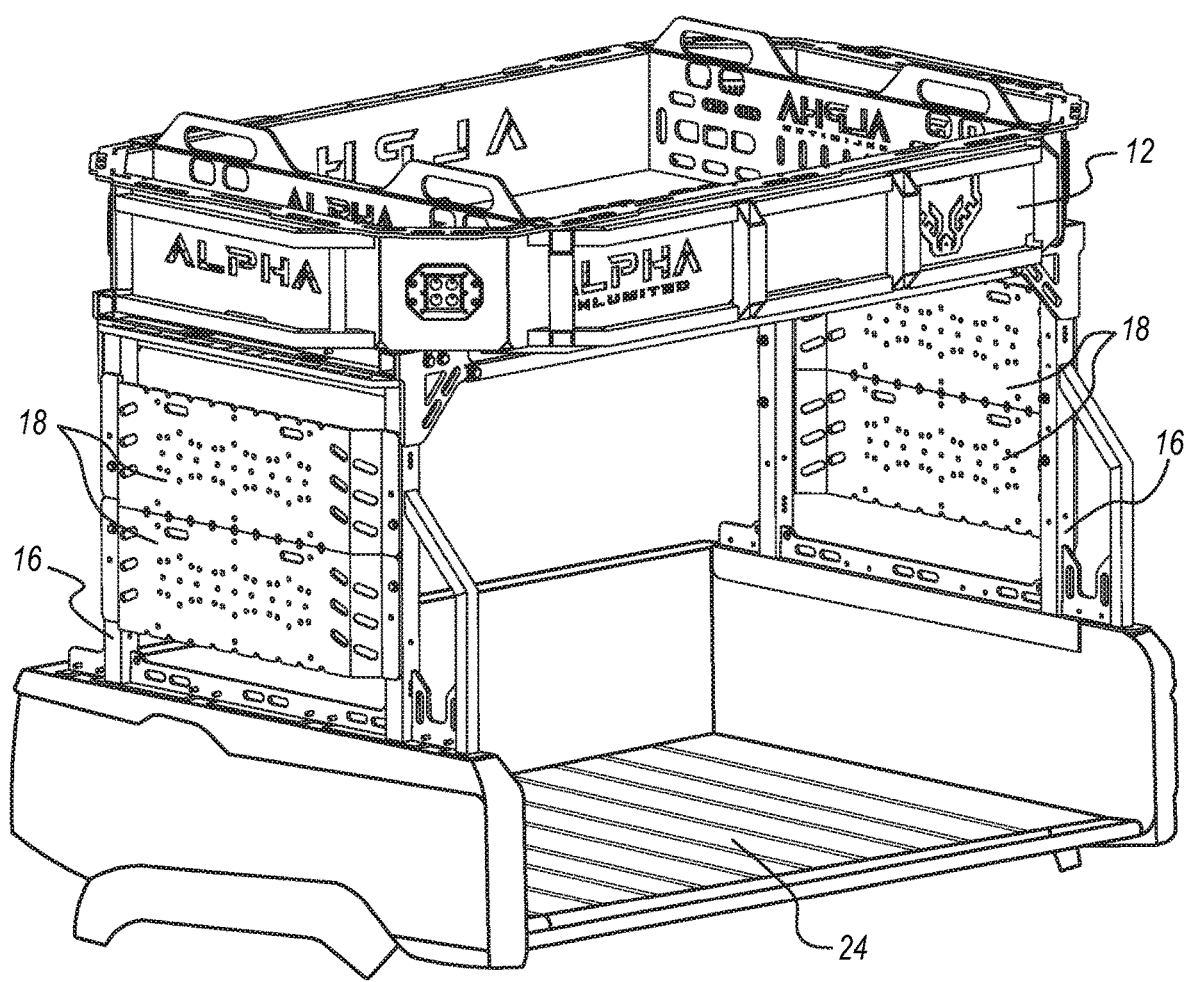
FIG. 21 is a back perspective view of one embodiment of the cargo rack of the present invention in the up position.
Figure 24:
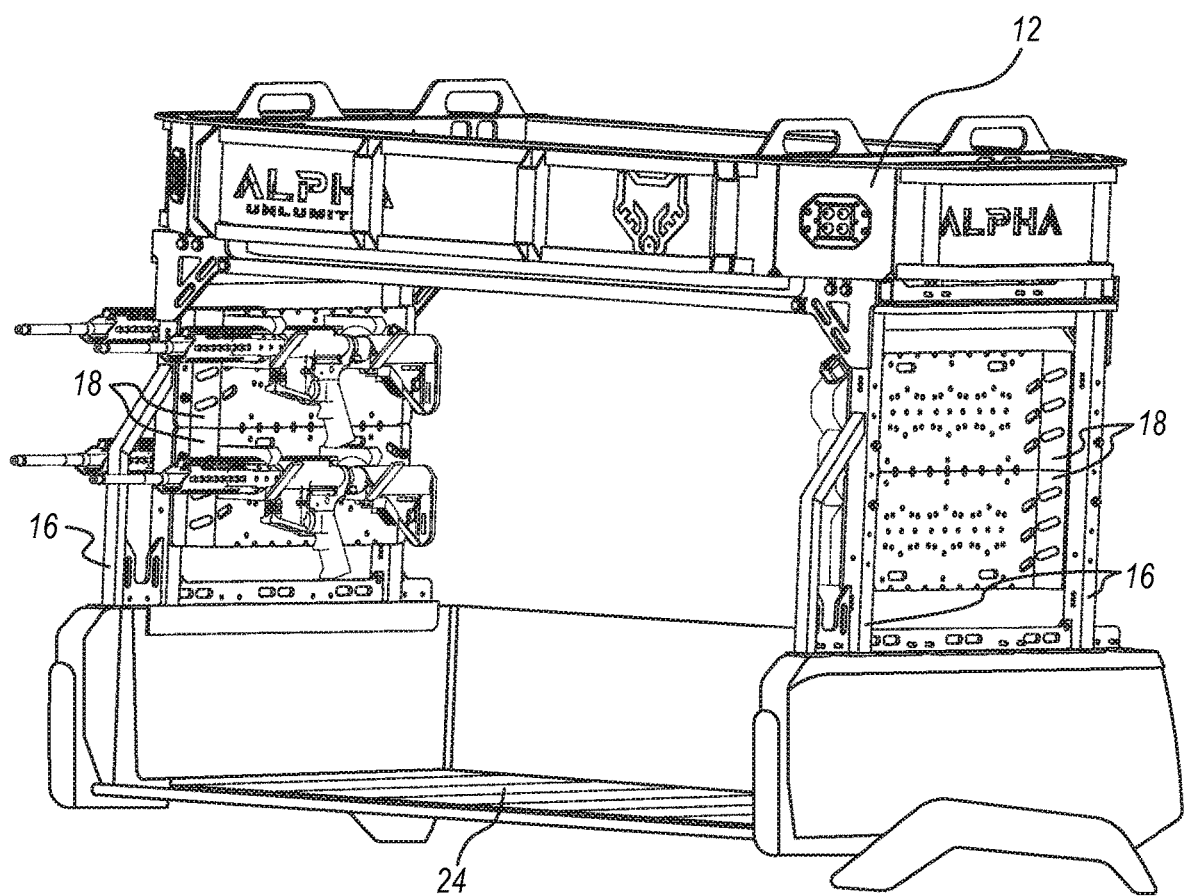
FIG. 24 is a back perspective view of one embodiment of the cargo rack of the present invention in the up position.
Figure 26:
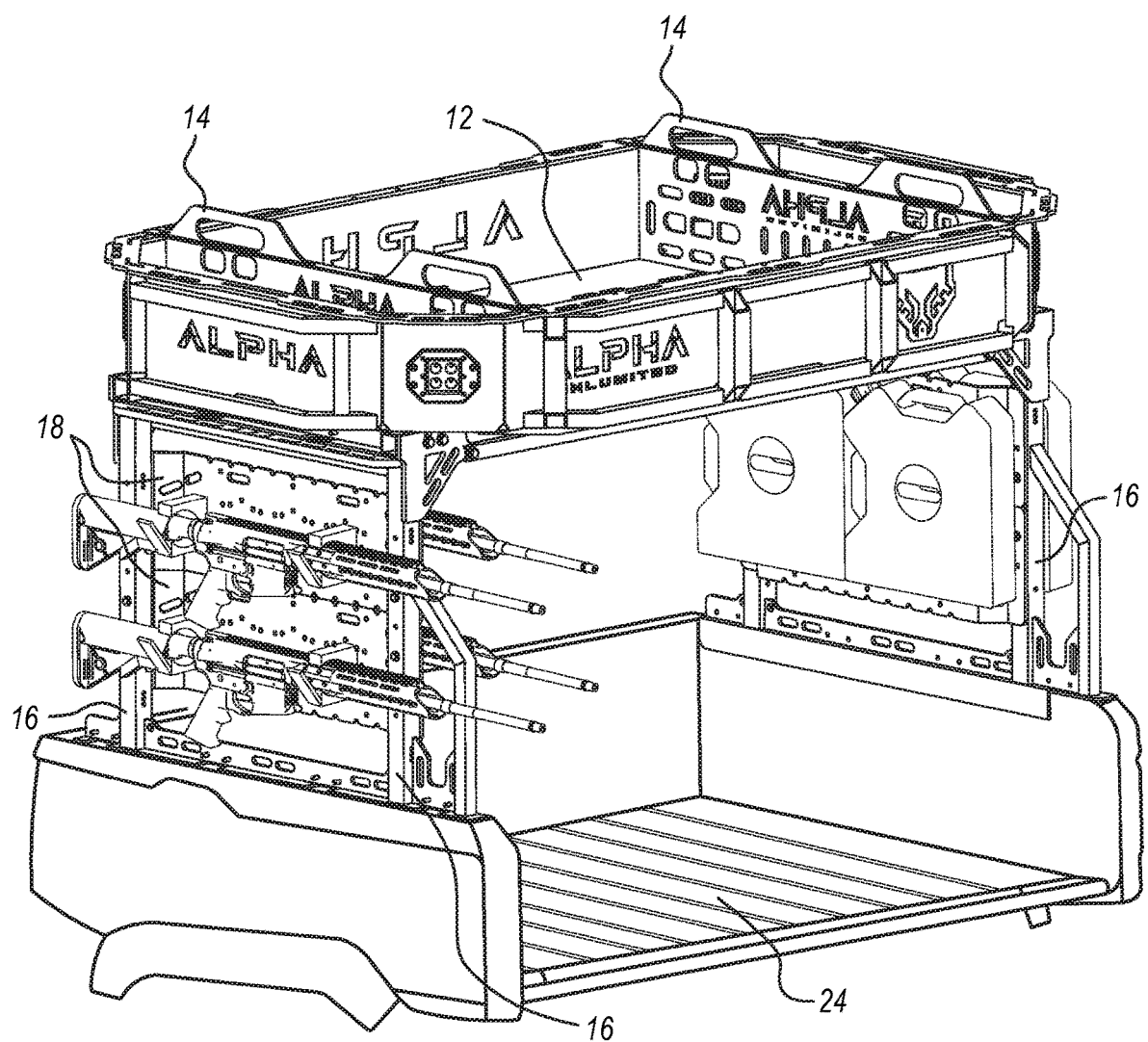
FIG. 26 is a back perspective view of one embodiment of the cargo rack of the present invention in the up position.

Similarly, two panels 18 may be attached to the supports 16 in a double-stack configuration on either or both sides of the cargo rack 10 and either extending towards or away from the opposite side of the cargo rack 10. For example, FIG. 18 shows two panels 18 mounted to the inside of the supports 16 on both sides of the cargo rack 10. The panels 18 on the left side of the cargo rack 10 extend towards the right side of the cargo rack 10, and the panels 18 on the right side of the cargo rack 10 extend away from the left side of the cargo rack 10. FIG. 19 shows two panels 18 mounted to the inside of the supports 16 on both sides of the cargo rack 10. The panels 18 on the left side of the cargo rack 10 extend towards the right side of the cargo rack 10, and the panels 18 on the right side of the cargo rack 10 extend towards the left side of the cargo rack 10. FIG. 20 shows two panels 18 mounted to the outside of the supports 16 on both sides of the cargo rack 10. The panels 18 on the left side of the cargo rack 10 extend towards the right side of the cargo rack 10, and the panels 18 on the right side of the cargo rack extend away from the left side of the cargo rack 10. FIG. 21 shows two panels 18 mounted to the outside of the supports 16 on both sides of the cargo rack 10, and the panels 18 extend away from each other. An example of use of double panels 18 is shown in FIGS. 24 and 26.

Figure 25:
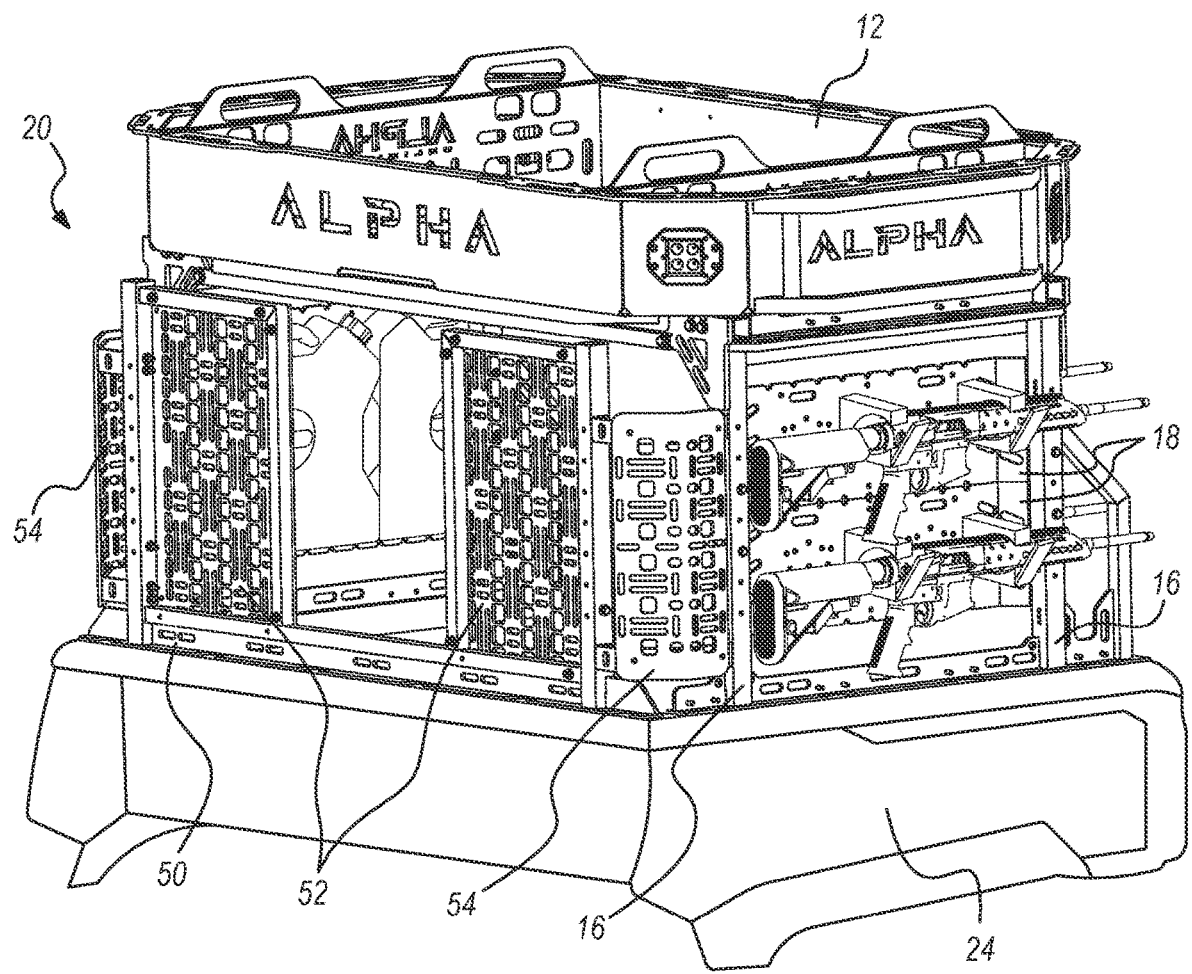
FIG. 25 is a front perspective view of one embodiment of the cargo rack of the present invention in the up position.
Figure 27:
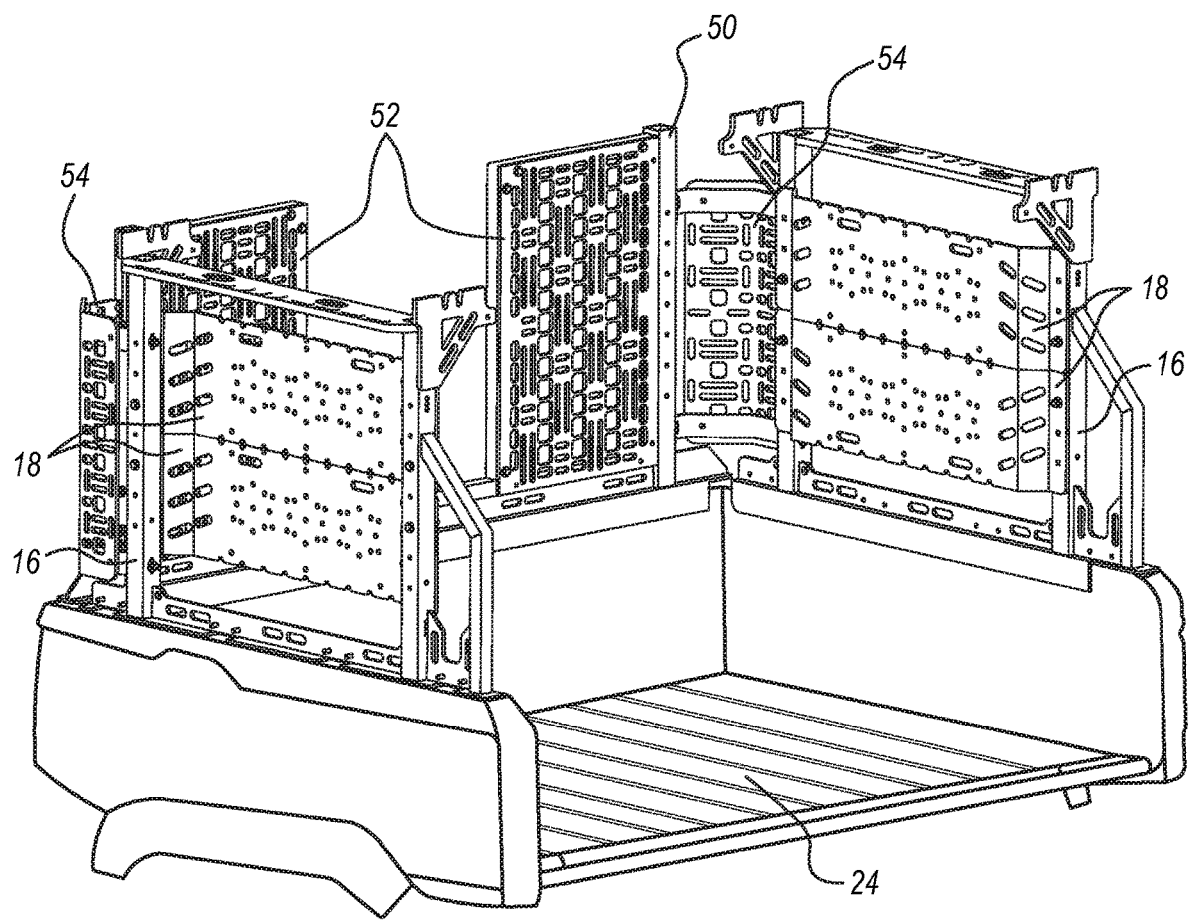
FIG. 27 is a back perspective view of one embodiment of the cargo rack of the present invention with the bed omitted.
Figure 28:
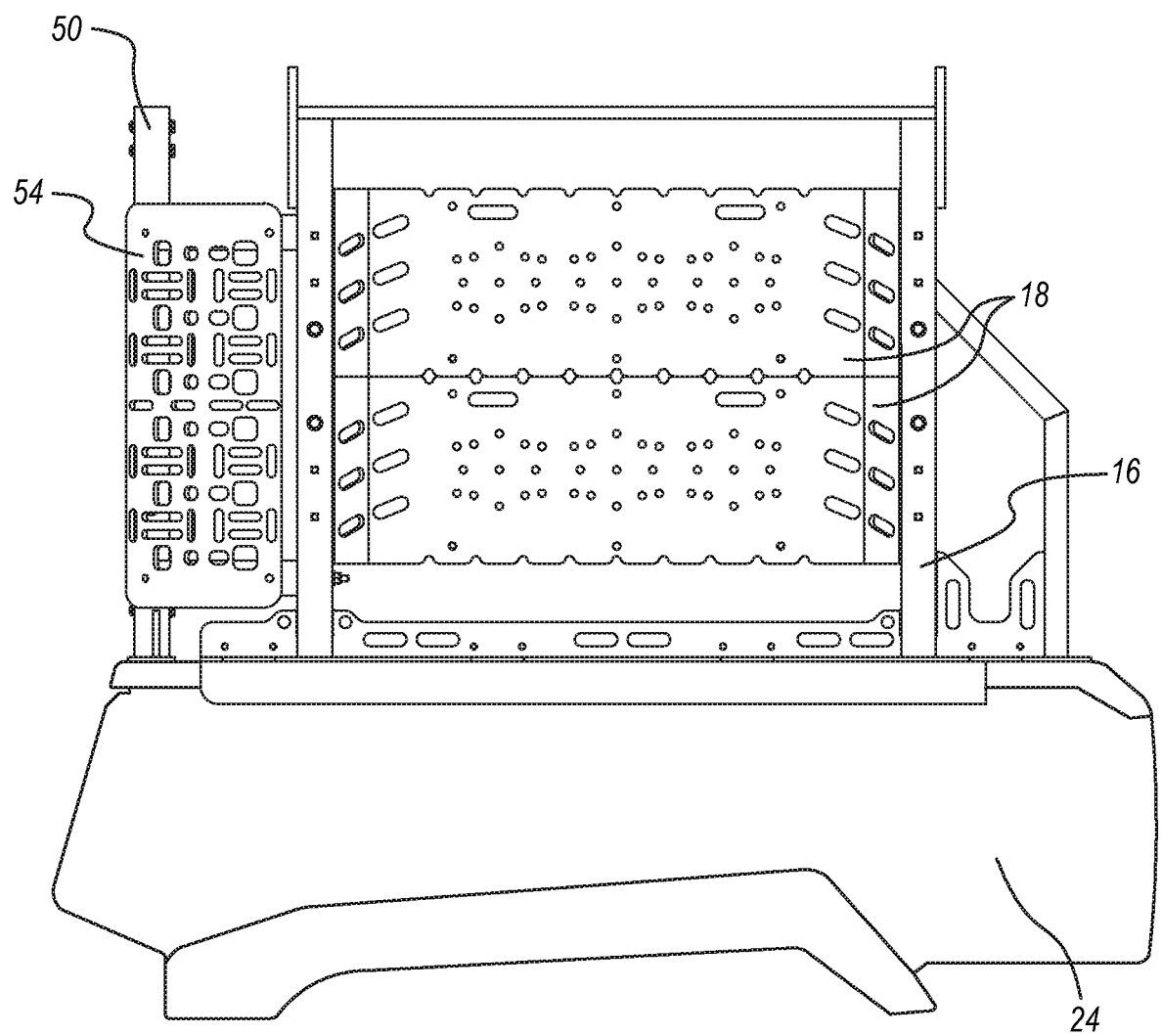
FIG. 28 is a side view of the cargo rack of the present invention with the bed omitted.
Figure 29:
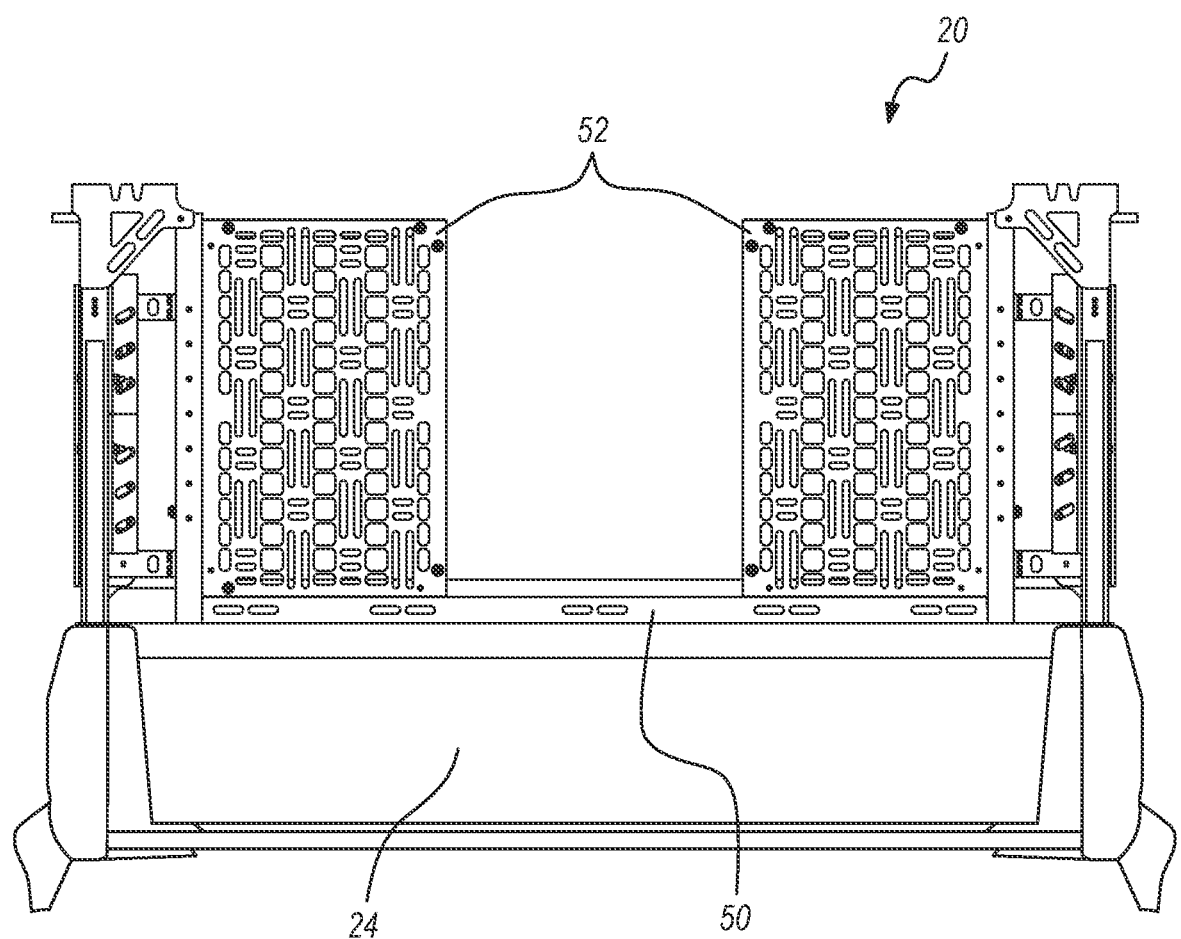
FIG. 29 is front view of one embodiment of the cargo rack of the present invention with the bed omitted.

The cargo rack 10 may also include a headache rack 20, as shown in FIGS. 23, 25, 27-29. The headache rack 20 includes hooks or tie-off points that allow the UTV user to secure additional tools, gear and equipment close to cab of the UTV where they are easily accessible and out of the way. The headache rack 20 is mounted to the front of the dump bed 24 of the UTV. The headache rack 20 preferably is mounted to the front wall of the dump bed 24 of the UTV with quick release fasteners that would be well-known to one skilled in the art. The headache rack 20 is also preferably fastened to the side supports 16. The headache rack 20 extends across the front of the dump bed 24 and is positioned between the cab of the UTV and the front surface of the supports 16 of the cargo rack 10. The headache rack 20 includes an outer frame 50 to which optional front plates 52 may be attached to permit the UTV user to configure gear and tools in multiple ways. For example, a headache rack 20 with two spaced front panels is shown in FIGS. 25, 27, and 29. Side plates 54 may also be attached at an angle to the frame 50 that are positioned in the space between the frame 50 and the front surface of the supports 16 of the cargo rack, such as shown in FIGS. 23, 25, and 27-28. The bed 12 of the cargo rack 10 may be removed with the headache rack 20 remaining mounted to the dump bed 24, which may be needed when extra large objects are being hauled in the UTV's dump bed 24.

The present invention has been described with reference to certain preferred and alternative embodiments that are intended to be exemplary only and not limiting to the full scope of the present invention as set forth in the appended claims.

We claim:

1. A cargo rack for a utility task vehicle, comprising:
a cargo bed, wherein a bottom of said cargo bed is supported by a frame, wherein said frame is configured to be fastened to a bed of a utility task vehicle with a fastener;
a plurality of side supports, wherein said plurality of side supports are fastenable to said cargo bed of said cargo rack and to said utility task vehicle, wherein said plurality of side supports comprises a first side support and a second side support, wherein a first side panel is attached between said first side support and said second side support,
wherein said cargo rack has an up position and a down position when fastened to said bed of said utility task vehicle, wherein said plurality of side supports are fastened to said cargo bed and to said utility task vehicle when said cargo rack is in said up position and wherein said plurality of side supports are not fastened to said cargo bed or said utility task vehicle when said cargo rack is in said down position.

2. The cargo rack of claim 1, further comprising a divider positioned in said cargo bed of said cargo rack.

3. The cargo rack of claim 2, wherein said divider comprises a handle.

4. The cargo rack of claim 2, wherein said divider comprises openings operable for securing goods to said divider.

5. The cargo rack of claim 2, wherein a portion of said divider is received in a slot in a bottom of said cargo bed of said cargo rack to secure said divider to said bed of said cargo rack.

6. The cargo rack of claim 1, further comprising a headache rack fastenable to said utility task vehicle.

7. The cargo rack of claim 6, wherein said headache rack comprises a frame and a plurality of side plates attached to said frame.

8. The cargo rack of claim 1, wherein a second side panel is attached between said first side support and said second side support, wherein said first side panel and said second side panel are attached on opposite sides of said first side support and said second side support, wherein a compartment is formed between said first side panel and said second side panel.

9. The cargo rack of claim 8, wherein a third side panel and a fourth side panel are attached between said first side support and said second side support, wherein said third side panel and said fourth side panel are attached on opposite sides of said first side support and said second side support, wherein said third side panel is positioned below said first side panel and said fourth side panel is positioned below said second side panel.

10. The cargo rack of claim 1, wherein said first side panel comprises openings operable for securing goods to said first side panel.

11. The cargo rack of claim 1, wherein said first side support comprises a handle.

12. The cargo rack of claim 1, wherein a standoff tube is attached to an exterior surface of said cargo bed of said cargo rack.

13. The cargo rack of claim 1, wherein said frame of said cargo bed of said cargo rack is fastenable to said bed of said utility task vehicle with quick release fasteners.

14. The cargo rack of claim 1, wherein said plurality of side supports are fastenable to said frame of said cargo bed of said cargo rack and to said utility task vehicle with quick release fasteners.

15. A cargo rack for a utility task vehicle, comprising:
a cargo bed fastenable to a bed of a utility task vehicle;
a first side support and a second side support, wherein said first side support and said second side support are fastenable to said cargo bed of said cargo rack and to said utility task vehicle, wherein a first side panel is attached between said first side support and said second side support,
wherein said cargo rack has an up position and a down position when fastened to said bed of said utility task vehicle, wherein said first side support and said second side support are fastened to said cargo bed and to said utility task vehicle when said cargo rack is in said up position and wherein said first side support and said second side support are not fastened to said cargo bed or said utility task vehicle when said cargo rack is in said down position.

16. The cargo rack of claim 15, wherein a second side panel is attached between said first side support and said second side support, wherein said first side panel and said second side panel are attached on opposite sides of said first side support and said second side support, wherein a compartment is formed between said first side panel and said second side panel.

17. The cargo rack of claim 15, wherein said first side support comprises a handle.

18. A cargo rack for a utility task vehicle, comprising:
a cargo bed, wherein a bottom of said cargo bed is supported by a frame, wherein said frame is configured to be fastened to opposing sides of a bed of a utility task vehicle; and
a first side support, a second side support, a third side support, and a fourth side support, wherein a first end of said first side support is configured to be fastened to said frame, wherein a second end of said first side support is configured to be fastened to one of said opposing sides of said bed of said utility task vehicle,
wherein said cargo rack has an up position and a down position when fastened to said opposing sides of said bed of said utility task vehicle, wherein each of said first side support, said second side support, said third side support, and said fourth side support is fastened to said frame and to one of said opposing sides of said bed of said utility task vehicle when said cargo rack is in said up position and wherein said first side support, said second side support, said third side support, and said fourth side support are not fastened to said frame or to said one of said opposing sides of said bed of said utility task vehicle when said cargo rack is in said down position, wherein said bottom of said cargo bed is positioned above said opposing sides of said bed of said utility task vehicle when said cargo rack is in said down position.

* * * * *